US 8,816,829 B2

(12) United States Patent
Beck

(10) Patent No.: US 8,816,829 B2
(45) Date of Patent: Aug. 26, 2014

(54) HOUSEHOLD APPLIANCE CONTROL SYSTEM

(76) Inventor: Wilfried Beck, Wiesbaden (DE)

( * ) Notice: Subject to any disclaimer, the term of this patent is extended or adjusted under 35 U.S.C. 154(b) by 1643 days.

(21) Appl. No.: 11/629,742

(22) PCT Filed: Jun. 16, 2005

(86) PCT No.: PCT/EP2005/006466
§ 371 (c)(1),
(2), (4) Date: Aug. 7, 2007

(87) PCT Pub. No.: WO2005/124477
PCT Pub. Date: Dec. 29, 2005

(65) Prior Publication Data
US 2008/0030299 A1 Feb. 7, 2008

(30) Foreign Application Priority Data
Jun. 18, 2004 (DE) .......................... 10 2004 029 548

(51) Int. Cl.
H02J 13/00 (2006.01)
H05B 37/02 (2006.01)
H04B 3/54 (2006.01)

(52) U.S. Cl.
CPC ........ H05B 37/0263 (2013.01); H02J 13/0048 (2013.01); Y02B 90/2692 (2013.01); H04B 3/54 (2013.01); Y02E 60/783 (2013.01); Y04S 40/1223 (2013.01); H04B 2203/5458 (2013.01); Y04S 40/146 (2013.01)
USPC .................. 340/12.32; 340/12.33; 340/13.23; 340/538

(58) Field of Classification Search
CPC .............................. H02J 13/044; H02J 13/048
USPC ................. 340/5.1, 12.22, 12.32, 13.33, 538, 340/538.11, 12.33, 13.32; 307/2, 3, 140; 375/257
See application file for complete search history.

(56) References Cited

U.S. PATENT DOCUMENTS

| 3,818,466 A | * | 6/1974 | Honda ......................... 340/517 |
| 4,200,862 A | | 4/1980 | Campbell et al. |
| 4,300,126 A | | 11/1981 | Gajjar et al. |
| 4,429,366 A | | 1/1984 | Kennon et al. |
| 4,914,431 A | * | 4/1990 | Severson et al. ........... 340/13.29 |
| 5,365,154 A | | 11/1994 | Schneider et al. |
| 5,614,811 A | | 3/1997 | Sagalovich et al. |
| 2004/0109499 A1 | * | 6/2004 | Cern ............................. 375/222 |

FOREIGN PATENT DOCUMENTS

WO 99/48340 9/1999

* cited by examiner

Primary Examiner — Edwin Holloway, III
(74) Attorney, Agent, or Firm — The Webb Law Firm

(57) ABSTRACT

Household appliance control system, comprising at least one appliance switch, at least one device supplying functional commands, at least one device supplying power and at least one household appliance, wherein the aforementioned devices are at least partially arranged in a building power supply network, and wherein these devices at least partially communicate among each other via said building power supply network, by impressing information independently to their respective zero-crossing either on an alternating voltage or on an alternating current, whereby said information can be read out again from both of the voltage and current, and whereby said information exclusively consists of real power instead of using high frequency modulation or even an additional line for data transmission purpose.

60 Claims, 8 Drawing Sheets

HOUSEHOLD APPLIANCE CONTROL SYSTEM

BACKGROUND OF THE INVENTION

1. Field of the Invention

The invention relates to a household appliance control system for switching or controlling at least one household appliance, and it relates to the reduction of the number of switches, and it relates to a device supplying power and to a device supplying functional commands.

2. Description of Related Art

In buildings and houses current consumers like for instance household appliances are usually switched by a system, which usually comprises switches, which do open or close a power supply line by actuating one single actuating element per switch and per household appliance, hereby supplying the respective current consumer with its current or not. Hence also more than one of the household appliances can be connected to a single actuating element or switch respectively, like for instance all the lamps in one room.

However, the term "household appliance" in this application is defined such that said term means at least one household appliance. A current consumer of such a type can be connected to a building power supply network directly or indirect via a socket-outlet, like lamps for instance.

Particularly in the constellation of said second example it is also possible, that if such a switch, operating for instance as a child-proof switch, switches all the current consumers at the same time, which are connected to said socket-outlet, like for instance switching an immersion boiling device, a vacuum cleaner, a lamp or even a TV.

This feature, that a variety of different appliances being switched by one switch only can also be provided by said current consumers themselves, for instance by a multi-outlet power strip, if they are all connected to said building power supply network. In this example or by the help of similar solutions, a plurality of current consumers, which are all connected to the building power supply network, can be switched by one single switch only.

Since the most current consumers provide their own characteristic surge impedance, which however can also comprise a capacitive portion, it is characteristic for such a type of switching operation, that with each switching operation, always a different capacity affects said building power supply network, particularly in the case that a plurality of current consumers at once is connected to said building power supply network. It is further more characteristic for such a type of switching operation, that during the respective switching operation an always-different capacitance affects said building power supply network. It is useless to say that in the case when current consumers are switched for a long lasting period they also do provide a long lasting affection.

This type of capacitive or inductive portions of power provide a significant obstacle to develop as household appliance control system, because according to this reason and due to such a type of noise it is simply not possible to use the building power supply network to transport any data.

An additional obstacle to use said building power supply network to transport data is the negative experience the industry made with the so called "power line", since said companies were not able to minimize the radio interference of said so called "power line" below the threshold allowed, resulting that experts concluded, that it would not be possible to use the building power supply network for data transportation purpose significantly.

In the course of this application this type of state of the art systems, which supply the building power supply network with a characteristic impedance, which however can also comprise a capacitive portion, will be called "break contact opening systems".

SUMMARY OF THE INVENTION

It is an object of the present invention to provide a household appliance control system, which uses an already existing building power supply network for data transportation purpose, in order to switch the various current consumers, connected to it, each common household is equipped with.

It is a further object of the present invention to provide a household appliance control system which switches current consumers in buildings and households like for instance at least one heating, air conditioner, rolling shutter, jalousie, the Hi-Fi-rack in a room or various other consumers not only on and/or off, but also provides the possibility to control defined functions of this appliances.

It is a still further object of the present invention to provide a household appliance control system which needs a minimum number of switches for switching and controlling the various current consumers, connected to the household appliance systems, and their functions.

It is an other still further object of the present invention to provide a household appliance control system, which controls and/or switches all of the household appliances and other current consumers, either each of said consumers individually or all of those, which are gathered in groups at once from each position of a previously defined area of home, by a minimum number of actuating elements, whereby the respective area of home can be defined individually.

Presently in this invention the term "household appliance control system" defines a system of individual components, each of them being part of a house, particularly being part of a building power supply network of said houses, including the current consumers connected with it.

It is an advantage of a household appliance control system, comprising at least one household appliance switch, at least one device supplying functional commands, at least one device supplying power and at least one household appliance, which are at least partially arranged in a building power supply network, and which do at least partially communicate via said building power supply network among each other, by impressing information independently to their respective zero-crossing either on the alternating voltage or on the alternating current, whereby said information can be read out again from both of them, and whereby said information exclusively consists of real power, is that said household appliance control system can be set up by discrete modules, providing that each of the single components can be produced, installed and connected for a reasonable price as well as and flexible. Hence, it is furthermore possible to combine the particular advantages of each of the single modules for instance in such a way, that the additional advantage can be achieved, that one of said modules can even be built in, if only a very small space for installation is available, as it is the case, when the function of each of said modules can be further more adapted individually.

Thus, in an ideal case, according to the invention, only one single household appliance switch per previously defined area of home is necessary in order to supply all the household appliances or other current consumers in said area of home with the electrical power each of them individually needs to work. This means that, contrary to the state of art, said household appliance switch not only switches said group as a whole, but also subgroups, which are definable individually, or can even switch each of said household appliances individually.

Further more, in an ideal constellation, when only one single device supplying functional commands per building power supply network is necessary, in which all those functions can be integrated and provided, in said ideal constellation previously mentioned, whereby said functions do not have to be adapted individually to one of the respective current consumers, which means that they therewith do not have to be installed into or even near said respective current consumer.

A part of said device for instance, which does serve to supply all said household appliances or even other current consumers with their respective information to switch or with their respective information to control.

Further more, devices supplying power can be provided, which are connectable to such a household appliance, or which can be integrated into each household appliance or which are connectable to a respective consumer of electrical power or can be integrated into it. Hence precisely said respective current consumer is locally supplied with precisely the amount of power, said respective consumer is supposed to receive or is allowed to receive.

Said restriction of the functions of said device supplying power being qualified for the respective current consumer to each respective current consumer, as previously mentioned, has the advantage that the size necessary for installation can be reduced to a minimum.

If said device supplying power is supposed to be integrated into a bulb for instance, it has to fit into said bulb physically, i.e. it has to have the physical dimension, appropriate to fit into it. Hence it is advantageous for said device supplying power to comprise a minimum number of components min order to minimize its dimensions. On the other hand said device supplying power has to compute a huge number of arithmetic operations.

In order not to be forced to install additional components and in order to minimize the complexity for the installation, it is advantageous, if the power supply system, which is installed in each house or building can also be used as a transmission medium for information transmission. This can be realized advantageously by transmitting via said power supply system said functional commands previously defined.

Therefore it is an advantage impressing information independently to their respective zero-crossing either on the alternating voltage or on the alternating current, whereby said information can be read out again from both of them, and whereby said information exclusively consists of real power, a very suitable period for impressing distinct real power is the period while said building power supply network is disconnected from the supplying power plant, with the effect that said building power supply network, which is disconnected from said supplying power plant can be controlled, which means that as a result, the noise of the building power supply network can be reduced to a minimum for instance by switching a particular electrical, electronic circuit providing said effect, that during said period, the desired information can be impressed on the alternating voltage or on the alternating current and that it can also be read out again at any place of said building power supply network.

This means that transmission of information is possible without using high frequency modulation and/or without a separate line for data transmission purpose The inductive and capacitive portions of power, added by each switch on-/switch off procedure of a power consumer, by each respective power consumer will be compensated by said particular electrical, electronic circuit, such that that said portions do not interfere with the information supplied to and transmitted by said building power supply network.

According to this invention it is not necessary anymore to impress information in/near the zero crossing of the current and/or the voltage.

In fact, because of said minimization of noise each phase difference of the sinus-oscillation of the current or of the voltage or of both of them can be used for said impression and the phase difference of the sinus can be used as well as the whole amplitude as a suitable carrier of information, whereby the amplitude of the respective information to be impressed can be added or subtracted to the genuine curve progression of said sinus.

A building power supply network, which is controlled by the aforementioned principles can thus serve as a means of transport for a variety of information, like information of a switch, like the aforementioned household appliance switch, or for information in order to operate or to control a current consumer, whereby said information might also result from different origins than from said household appliance switch itself.

In contrast to said "break contact opening systems", aforementioned in the description of the state of art, said principle in this invention will be called "switch control system", because said system is enabled to be controlled by said short termed disconnection of the power plant and thus will be enabled to impress information which can be read out again to the alternating voltage as well as to the alternating current.

The short-termed disconnection of the power plant according to the invention provides the effect that neither the reactive power nor the complex power provide any potentiality to interfere anymore; thus it is only the pure real power upon which information is impressed to, or even more precisely; that said aforementioned control by impression of a variation of real power can take place independently to the stress of the home appliance network i.e. the number of current consumers connected to it, such that said information can be read out again at any other position within the building power supply network.

The aforementioned functional commands can advantageously be categorized into two functional levels, and into two groups, such that said power supply network comprises at least two functional levels, whereby functional commands can be transmitted in each of said functional levels.

Advantageously a first functional level, is the one which helps defining in which of the functional levels existing, the operator is working and is giving commands, like for instance in a first operating level, in a second etc. operating level, in a programming level, in a scenario level etc.

Advantageously in each of said functional levels, the first group of commands helps to pass through the matrix as explained further below, and advantageously the second group is the group of the respective individual functional commands, by which the operator can actuate the various functions of each household appliance or current consumer, directly without passing through a menu like for instance switching it on or off, selecting one of its features etc.

It is an advantage of a household appliance control system, in which communicating said functional commands via said building power supply network is unaffected by low-impedance appliances, that utilization of a building power supply network is independent from the issue, which type of current consumer is connected to said building power supply network.

It is a further advantage, that the building power supply network remains independent to each current consumer connected to it, and that the building power supply network remains independent to the group of current consumers, connected to it for communication purpose.

The capacitive and inductive portions of power provided to the building power supply network by said current consumers to the building power supply network, when they are switched, can be compensated by said particular electronic or electrical circuit, such that said portions cannot interfere with the information transmitted in the building power supply network.

In an advantageous embodiment said building power supply network is forwarding commands from at least the device supplying functional commands to at least one device supplying power.

To control said forwarding, subsidiary devices could hereby be applied even outside the building power supply network. Thus said parts of a building power supply network, in which information are transported according to the invention, said parts of a building can also be connected by radio transmission among each other.

A further subsidiary device, like said radio transmission device, might also be a separate control line, for instance to connect parts of the house appliance switch to the device supplying functional commands.

However, in any case the information is transported by impressing real power according to the invention, which on the other hand does not mean that the person skilled the art would not combine said impression of real power according to the invention, with other solutions to transport information, like by radio transmission and/or a control line. Such a combination might be suitable in cases in which the information of a first building power supply network are transmitted to a second building power supply network, without providing a direct connection between said two building power supply networks.

This would also provide the advantage that parts of the household appliance switch can be operated independently to the voltage, said building is supplied with, and hence can be operated safer. The functional commands, transmitted to the device supplying power by the device supplying power are transmitted according to the invention by the building power supply network, or at least by a part of it (i.e. one could even think of dividing a single building power supply network into two networks, whereby both networks do communicate with each other vie radio control), however a functional command can thus be provided to all the devices providing power in all building power supply networks connected with each other.

To integrate said device according top the invention into a building power supply network, already existing and without having to start any construction works at said building power supply network, it is advantageous communicating said functional commands between at least one of said house appliance switch, said device supplying functional commands and said device supplying power is effected exclusively via said existing building power supply network.

In said case according to the invention, when said building power supply network serves for communication purpose, by impressing information either to the alternating voltage or to the alternating current independent to their respective zero-crossing, whereby said information exclusively consists in real power and whereby said information can be read out again, it is an advantage of a device supplying functional commands, arranged in a building power supply network, and further more also positioned between at least one household appliance switch and at least one device supplying power, that functions can be integrated in a further component, denoted in the following as "device supplying functional commands", which in the opposite case would then have to be integrated into each of said respective current consumers, Hence said "device supplying functional commands" can provide an own control centre, which is necessary to provide the control functions or commands respectively, necessary for all the current consumers of the household appliance network to operate.

It is advantageous, impressing information either to the alternating voltage or to the alternating current independent to their respective zero crossing, whereby said information exclusively consists in real power and whereby said information can be read out again.

Said impression of real power can easily be realized, if during the period of impression the building power supply network is disconnected from the supplying power plant for a very short period, such that said building power supply network, disconnected from the supplying power plant, can be controlled in such a way, that as a result the noise of the building power supply network can be reduced by a particular electrical circuit so far, that the information, the operator wants to impress can be impressed upon the voltage and/or the current and that they can be read out again at any place within the building power supply network.

Those inductive or capacitive portions of power, supplied to said building power supply network by the current consumers themselves, for instance by any switch on/switch off—operation, will be compensated by said particular electric circuit, such that as a result said inductive or capacitive portions of power do not interfere with said information supplied by the building power supply network, such that they do not have any influence upon said information.

According to this invention it is not necessary anymore to impress information in/near the zero crossing of the current and the voltage respectively. In fact according to the invention, and because of said minimization of noise provided herewith, each phase difference of the sinus-oscillation of the current or of the voltage or of both of them can be used for said impression and the phase difference of the sinus can be used as a carrier of information as well as the whole amplitude, or even both of them at the same time, whereby the amplitude of the respective information to be impressed can be added or subtracted to the curve progression of the sinus.

A building power supply network, which is controlled by the aforementioned principles can thus serve as a means of information transport for a variety of information, like information of a switch, like it is the case in said aforementioned household appliance switch, or for information in order to operate or to control a current consumer, whereby said information might also result from different origins than only from said household appliance switch itself.

In contrast to said "break contact opening systems", aforementioned in the description of the state of art, according to the invention, said principle will be called "switch control system", because said system is enabled to be controlled by said short termed disconnection of the feeding power plant and thus it will be enabled to impress information which can be read out again, to the alternating voltage as well as to the alternating current, without getting interfered.

The short-termed disconnection of the feeding power plant according to the invention provides the effect that neither the reactive power nor the complex power can provide any potentiality to interfere anymore; thus it is exclusively said pure real power upon which information is impressed on, or even more precisely; that said aforementioned control by impression of a variation of real power can be realized independently to the stress of the home appliance network, i.e. the number of current consumers connected to it, such that in such a case, said information can be read out again at any other position within the building power supply network.

Advantageously said device supplying functional commands comprises at least one functional command entrance module, in which switching commands of at least one household appliance can be identified.

Hereby the legibility of the switch command, provided by the switch state of the household appliance switch is checked as well as the fact whether said information can be identified as a known switch state at all, whereby switch commands are provided by said switch state, whereby said household appliance switch is emitting switch commands by the respective switch state, whereby said switch commands will be converted inside said switch into standardized switch commands and will be supplied into said building power supply network by a transmitter which is integrated into said switch, towards a receiving section.

This receiving section of the switch is a component, physically integrated into said functional command entrance module and herewith also integrated into the device supplying functional commands.

Advantageously the device supplying functional commands further more comprises a functional command status converter, which allocates at least one functional command to the respective switching commands of the at least one household appliance switches.

Thus the advantage is provided that said conversion of said switch status of said household appliance switch into functional commands can be realized in one central module only.

One possible way of allocation can for instance be realized by two allocation matrices, which are superposed to each other.

Thus for instance a switching function, like two clicks of the household appliance switch might activate running the rows of said matrix and a single click of the household appliance switch might activate running the columns of said matrix. In said columns one could allocate the functional levels. With the help of a further functional command one could run the respective row of said matrix.

Alternatively one could also call up a scenario directly, allocated in said matrix by a previously defined switch status by jumping to the respective position of the matrix directly.

This allocation can be programmed freely anyhow. Additional possibilities of allocation will be described in the embodiments following below. Therefore said functional command status converter has access to programmable memories and will be supported hereby by a processing unit (CPU).

Advantageously the device supplying functional commands further more comprises also a functional command output unit, outputting allocated functional command to the building power supply network. In order to provide said building power supply network with said commands, it is advantageous to operate said function in a particular module portion, which exclusively impresses the respective switching commands to the building power supply network.

Hence a particular section of said building power supply network is defined which transmits information can also be defined by the term "current consumer feed cable". Further more the functional command output unit can also be used as a receiving section for information, provided for instance by the current consumer or the device supplying functional commands.

Advantageously in this particular case information is mentioned, which is affected by the current consumer itself or by its consumption behaviour and thus impressed upon the current. Furthermore the functional command output unit provides the feature to tranquillise said building power supply network and particularly to tranquillise the portion of the current consumer feed cable, or even more precisely, to control it, in order to provide the effect, that the noise they comprise will be reduced that much, so that information, provided as real power itself which was impressed before can be read out again at any other place of said network.

By this reason this part of the building power supply network, starting from the functional command output unit can be defined by the term, whereby which however remains a portion of the building power supply network nevertheless comprises in this part a variety of status according to the invention.

The components of the device supplying functional commands as described do not necessarily have to be integrated within a single building panel, but whenever appropriate can also be located at distinct places.

The previously mentioned functional commands can advantageously be categorized into two groups, such that said building power supply network or even more precisely the current consumer feed cable comprises at least two functional levels and comprises in each of said functional levels, wherein functional commands can be transmitted/propagated.

Advantageously a first functional level is the one which helps defining in which functional level the operator is working respectively and is feeding commands into it, like for instance first operating level, second operating level, programming level, scenario level etc.

Advantageously the second group is the group of the respective individual functional commands, by which the operator can actuate the various functions of each household appliance or current consumer, like for instance switching it on or off, selecting one of its features etc.

It is an advantage of a device supplying functional commands by which communicating said functional commands via an existing building power supply network or even more precisely via the current consumer feed cable is unaffected by low-impedance current consumers, that utilization of a building power supply network is independent to the fact, which type or types of current consumer or current consumers are connected to said building power supply network.

It is a further advantage for communication purpose that said building power supply network could be used independently from the current consumer or from the current consumers.

It is an advantage of a device supplying functional commands whereby functional command output unit it self is a low-impedance power supply source, which itself is supplied with energy by said current consumer feed cable, that said transfer of information by said real-power-pulses is independent to the current consumer connected with said building power supply network.

It is a further advantage that said building power supply network can be used independently from the current consumer connected to it or the various current consumers also connected to it, both for communication purpose towards said current consumers.

The capacitive or inductive power-portions added to said building power supply network by said current consumers, for instance by a switching on/off operation are compensated by said particular electrical or electronic circuit, such that as a result said inductive or capacitive portions of power do not interfere with the information supplied to and transmitted by said building power supply network.

This might be realized for instance, by superposing a voltage, precisely adjustable by the operator, or even by adding a particular impedance, which might also comprise ohmic, inductive or capacitive portions, like for instance provided by a suppressor capacitor, in order to effect inhibit/compensate said undesirable noise.

If said device supplying functional commands defines a functional level by the help of said functional command output unit in such a way, that a defined number of oscillations either of the alternating voltage or of the alternating current of the current consumer feed cable is impressed a characteristic feature of a current consumer feed cable each of said devices supplying power connected to said building power supply network can identify at the same time if the operating system mode is addressed at all and if that is the fact, which of its levels is addressed.

If said certain feature consists of a combination of real power pulses, which are outputted from the functional command output unit to the appliance feeding line the advantage is provided hereby, that there will no high frequency have to be modulated upon said power supply network already existing, whereby for such a transmission of the high-frequency-type, a building power supply network is not adapted very well anyhow.

One way to insert said real-power-pulses into said building power supply network or more precisely into said current consumer feed cable, is to superpose any particular point of the oscillation with a controlled voltage, to effect in each connected real-power-consumer precisely the variation of the instantaneous value of its real power desired, or even more precisely in order to effect a deviation of the curve of the instantaneous value of its real power, which distinguishes from the value supplied by the voltage of the supplying power plant significantly, whereby significantly means that said deviation can be read out again.

If the instantaneous value of the network of for instance 80V will for instance be superposed by a controlled voltage of for instance −20V, a new instantaneous value of the previous voltage of 60V instead of said 80V will be obtained in said current consumer feed cable, thus inducing a real power in the current consumers, connected to said current consumer network, deviating from the shape of the common shape of the sinus in the network.

This kind of real power pulses can be limited in their period and amplitude, such that the generally known behaviour of the current consumer does not change significantly.

Such a transmission of real power, induced by the voltage to current consumers precisely is the core objective of a building power supply network according to the invention; thus a building power supply network can provide a very reliable transmission (what systems of the BF-type for instance cannot provide).

Communication can also be realized in the opposite direction analogously, by gathering information about the connected current consumers since the functional command output unit detects their characteristic "fingerprint" for instance within the reactive power-portions or within the complex power-portions as well as within the harmonic waves, thus receiving information about the current consumers connected with it, whereby also said current consumers can provide additional information by creating real power-pulses. In this connection the information as well as the ways transferring them can be independent from each other.

It is an advantage, if the respective proper combination of real power pulses is provided by the functional command status converter because thus it can be realized that always the same allocation of the various switch status with their respective pulses can be used in one single central unit only.

It is a further advantage, if the functional command status converter provides precisely the same number of combination of pulses, corresponding to the switching states, received by the functional command entrance module.

Thus each switch status of the household appliances can be allocated with a particular combination of pulses by its functional command status converter, within a central module, like the device supplying functional commands, whereby said various switch status refer to a plurality of positions in a switch-status-matrix. Hence the real power pulses provided can be read out in the whole household appliance network at the same time.

If the device supplying functional commands defines a functional command by the functional command output unit in such a way that the functional command is propagated within an certain numbers of sinus-oscillations of the network, by a transmitting protocol, thus each of the devices supplying power, connected to the building power supply network can identify at the same time if a operating level or a operating function is addressed and if a operating function is addressed, which one of the various operating functions is addressed.

If a functional command is defined by a characteristic feature of a defined number of oscillations in the power line of the building power supply network, which is different to the characteristic feature of a defined number of oscillations defining the functional level, then said functional command and functional level can propagate information independently from each other as well as said information can also be read out again independently from each other. One can further more also define groups which are to be designated separately in an analogous way.

It is furthermore advantageous, if said impression of real power pulses upon the oscillation of the alternating voltage is effected by adding said information to its amplitude.

Hence the magnitude of the amplitude can be used as an information carrier as well as the amount being impressed.

If the phasing, of the of the oscillation of the voltage supplied to the appliance feed or its amplitude can serve as information carrier thus also the magnitude of the amplitude as well as the phase difference can serve as an information carrier, which increases the bandwidth for the information propagated via said current consumer feed cable significantly.

However, if the phase difference or the signal to be impressed is used as information carrier for each, the functional level as well as the functional command thus the bandwidth can be increased for said transfer of information.

If the number of oscillations, characterizing a functional command is lower or equal to the number of the oscillations characterizing a functional level, a precise size of a data packet can be defined advantageously without having to occupy bandwidth therefore.

As an advantage a huge variety of functions can be addressed, like the functional command addresses at least one household appliance separately, or groups of household appliances, or that functions of at least one household appliance and/or effects the chronological sequence of functions of at least one household appliance can be effected.

Further more also a huge variety of functions between current consumers thus can also be addressed, in that the functional command defines the cooperation of at least one function of a household appliance with at least one function of one or more further household appliances.

A particular advantage can be provided if said device supplying functional commands is connected to a fuse.

Said advantage is provided by the fact that the device supplying functional commands can be integrated or adapted easily to or into already existing building power supply networks. Thus a very effective protection against potential defects is provided, having a device supplying functional commands at the fuse.

A further advantage is provided if an emergency switch is connected directly to the device supplying functional commands.

Thus emergency functions can also be switched, if for instance parts of the device supplying functional commands might be out of control. At least parts of said emergency switch can also use the above described principles of transferring information transported via said current consumer feed cable according to the invention.

The advantage of a device supplying power, arranged in a building power supply network between a device supplying functional commands and at least one household appliance, whereby the building power supply network serves for their communication, by impressing information either to the alternating voltage or to the alternating current independent to their respective zero-crossing, whereby said information exclusively consists in real power and whereby said information can be read out again, is, that in this particular component, which in the following is defined by the term "device supplying power", various particular functions can be gathered which should be applied as close to the current consumer as possible, to supply the current consumer with individual functions adequately.

Hence, each current consumer can individually be supplied with precisely the amount of power said current consumer is supposed to receive, and which is allocated to the respective command, resulting from the device supplying functional commands and transmitted via said building power supply network. Thus the major part of data processing is allocated in this unit.

It is advantageous, impressing information either to the alternating voltage or to the alternating current independent to their respective zero crossing, whereby said information exclusively consists in real power and whereby said information can be read out again.

Said impression of real power can particularly be realized, if during the period of impression the building power supply network is disconnected from the supplying power plant for a very short period, such that said building power supply network, disconnected from the supplying power plant, can be controlled in such a way, that as a result the noise of the building power supply network can be reduced by a particular electrical circuit so far, that the information, the operator wants to impress can be impressed upon the voltage and/or the current and that they can be read out again at any place within the building power supply network.

The inductive and capacitive portions of power, added by each switch on/off procedure of a power consumer, from each respective power consumer will be compensated by said particular electrical or electronic circuit, such that as a result said inductive or capacitive portions of power do not interfere with the information supplied to and transmitted by said building power supply network.

According to this invention it is not necessary to impress information in/near the zero crossing of the current and/or the voltage anymore. In fact, because of said minimization of noise each phase difference of the sinus of the current or of the voltage or of both of them at once can be used for said impression and the phase difference of the sinus-oscillation can be used as a carrier of information as well as the whole amplitude, or even both of them at the same time, whereby the amplitude of the respective information to be impressed can be added or subtracted to the curve progression of the sinus.

A building power supply network, which is controlled by the aforementioned principles can thus serve as a means of transport for a variety of information, like information of a switch, like the aforementioned household appliance switch, or for information in order to operate or to control a current consumer, which might also result from different origins than from said household appliance switch itself.

In contrast to said "break contact opening systems", aforementioned in the description of the state of art, in this invention said principle will be called "switch control system", because said system is enabled to be controlled by said short termed disconnection of the power plant and thus will be enabled to impress information which can be read out again, to the alternating voltage as well as to the alternating current, without getting interfered.

Advantageously said device supplying power comprises a functional command entrance module, receiving the functional command.

It is a further advantage to allocate the reception of the functional commands in an own particular part of said module, which provides an interface to the building power supply network.

One might also say that said functional command entrance module comprises the receiving section of the switch collaterally. For each device supplying functional commands more than one functional command entrance module can be used.

Advantageously the device supplying functional commands comprises furthermore an activity converter, allocating a respective power quantity to the functional command.

This feature provides the advantage, that, at said particular place, where said current consumer is positioned and furthermore also individually for each current consumer, the conversion of functional commands into the activity release command, which is necessary individually, can be operated.

Advantageously the device supplying functional commands comprises furthermore a power disengaging unit, providing the respective amount of power.

Thus an individually portion of power can be provided for the current consumer, or even an individual function of a current consumer, which is allocated to a certain portion of power.

The previously mentioned functional commands can advantageously be categorized into two categories or groups respectively, such that said building power supply network or even more precisely the current consumer feed cable comprises at least two functional levels, each of them being provided for propagating functional commands.

Advantageously a first functional level is the one which helps defining in which operating level the operator is operating precisely and is feeding commands into it, like for instance into the first operating level, or into the second operating level, or into the programming level, or into the scenario level etc.

Advantageously the second group is the group of the respective individual functional commands, by which the operator can actuate the various functions of each household appliance or current consumer, like for instance switching it on or of, selecting one of its features etc.

It is an advantage of a device supplying power communicating said functional commands via the existing building power supply network is unaffected by low-impedance current consumers, that utilization of a building power supply network is independent to the fact, which type or types of current consumer or current consumers are connected to said building power supply network, A further advantage is, that for communication purpose, said building power supply network can be used independently from the current consumer or from the current consumers.

A device supplying power, comprising a power disengaging unit with a low-impedance voltage source, which itself is supplied with energy by said current consumer feed cable, provides the advantage that said current consumer which is connected with said power disengaging unit can be supplied with controlled power, as well as with designated control information, fed via said current consumer feed cable at the same time, whereby the control information can affect (control) the supplying power in the way the person skilled in the art programmed it.

If a functional level and at least one functional command are allocated to the device supplying power via said building power supply network, whereby the device supplying power is controlling the household appliance accordingly, an operation of said household appliance can be realized, individually adapted regarding the to the respective switch functions as well as regarded to the respective operating functions, to be controlled.

If the device supplying power is impressing an information to a sinus-oscillation of the supply voltage then information about the operating status or information about the current consumer itself can be transferred towards and via said current consumer feed cable, which can be read out again at any other place of the building power supply network and then being further processed.

Also in this case the sinus-oscillation provides three types of information carrier: firstly the phase difference, secondly the amplitude and thirdly the period or the particular place on which the sinus-oscillation can be varied.

It is a first way to impress the functional levels as well as the functional commands upon the sinus-oscillation of the current as compact as possible, if the phase difference or even the amplitude are used as an information carrier for said functional level on the one hand side or are used as an information carrier for the functional command on the other hand side.

If it is appreciated that the functional level as well as the functional command do occupy a minimum of bandwidth of the sinus-oscillation in the building power supply network; consequently it is advantageous, if the phase difference or the signal to be impressed on it will serve as a carrier of information for the functional level as well as for the functional command.

In order not to loose the switching-ability in the case of a breakdown of the device supplying functional commands and in order to keep the ability to switch current consumers even in such a case that a the building power supply network does not provide any commands for the device supplying functional commands, it is advantageous if an emergency switch, which might be an override switch which enables a switching operation or a control operation respectively of the emergency operability of at least one household appliance.

Hereby it is possible to use the principles according to this invention using the building power supply network as a medium to transfer information in the inventive way described before.

If said device supplying power is affixed to each appliance, the advantage is provided that each current consumer can be supplied locally with the real power, necessary for operating.

A household appliance switch comprising at least a single actuating element, at least a single switch element with at least two switch states per switch element, whereby each switch element has its own switch obstacle starting from the second switch state, provides the advantage, that at least one actuation obstacle is provided by the choice of said switch obstacle which refuses the access to further functional levels said switch does provide for the users, not inaugurated before.

Such an actuation obstacle might consist of a sound, a physical obstacle, a blip, or even of other hidden functions, like for instance of a bayonet catch.

Since a variety of different obstacles can be used, different types of access obstacles can be installed, each providing access to a different functional level.

If each single switch element, does provide at least two switch states per switch element the range of applications is increased significantly.

If each of the switch states, hidden by one of said obstacles addresses at least an different functional level in said building power supply network, the user not inaugurated has the illusion, to operate a common on-off switch or change-over switch, which in fact for an inaugurated user is an instrument he can use in order to switch the various functional levels and is an instrument by which he can control said levels respectively thus being able to address the various household appliances in the respective functional levels and/or at least one of their functions.

It is advantageous, impressing information either to the alternating voltage or to the alternating current independent to their respective zero crossing, whereby said information exclusively consists in real power and whereby said information can be read out again.

Said impression of real power can particularly be realized, if during the period of impression the building power supply network is disconnected from the supplying power plant for a very short period, such that said building power supply network, disconnected from the supplying power plant, can be controlled in such a way, that as a result the noise of the building power supply network can be reduced by a particular electrical circuit so far, that the information, the operator wants to impress can be impressed upon the voltage and/or the current and that they can be read out again at any place within the building power supply network.

The inductive and capacitive portions of power, added by each switch on/off procedure of a power consumer, from each respective power consumer will be compensated by said particular electrical or electronic circuit, such that as a result said inductive or capacitive portions of power do not interfere with the information supplied to and transmitted by said building power supply network.

This might be realized for instance, by superposing a voltage, precisely adjustable by the operator, or even by adding a particular impedance, which might also comprise ohmic, inductive or capacitive portions, like for instance provided by a suppressor capacitor, in order to effect inhibit said undesirable noise.

According to this invention it is not necessary to impress information in/near the zero crossing of the current and/or the voltage.

In fact each phase difference of the sinus-oscillation of the current or of the voltage or of both of them at the same time can be used for said impression because of said minimization of noise and the phase difference of the sinus-oscillation can be used as a carrier of information as well as the whole amplitude, or even both of them at the same time, whereby the amplitude of the respective information to be impressed can be added or subtracted to the curve progression of the sinus.

A building power supply network, which is controlled by the aforementioned principles can thus serve as a means of transport for a variety of information, like information of a switch, like the aforementioned household appliance switch, or for information in order to operate or to control a current consumer, which might also result straight from different origins than from said household appliance switch itself.

In contrast to said "break contact opening systems", aforementioned in the description of the state of art, in this invention said principle will be called "switch control system", because said system is enabled to be controlled by said short termed disconnection of the power plant and thus will be enabled to impress information which can be read out again, to the alternating voltage as well as to the alternating current, without getting interfered.

The short-termed disconnection of the power plant according to the invention provides the effect that neither the reactive power nor the complex power can provide any potentiality to interfere anymore; thus it is only the pure real power upon which information is impressed to, or even more precisely; that said aforementioned controlled impression of a variation of real power can be realized independently to the stress situation of the home appliance network, i.e. the number of current consumers connected to it, such that said information can be read out again at any other position within the building power supply network.

A household appliance switch which is unaffected by interferences, caused by low-impedance current consumers provides the advantage, that by the help of such a type of switch, a building power supply network already existing, can also be used for communication purpose with current consumers connected to it, whereby the switch does provide the communication-input means.

In this case, that a building power supply network remains unaffected from low impedance current consumers, a building power supply network can be used for communication purpose in a very easy and efficient way, and even independent of the types of current consumers which are connected to said building power supply network.

Said types of current consumers might consist of lamps, Hi-fi components, marquee, ventilators, kitchenware, blinds, purifiers, tools, electrical hobby stuff, toys, and all the various further current consumers which are supplied with voltage.

The reason therefore is, that in this case the noise provided by those current consumers, will not interfere with said information, which is provided by said switch, making communication impossible in the opposite case.

The inductive and capacitive portions of power, added by each switch on/off actuation of a power consumer by each of said respective power consumers, will be compensated by said particular electrical or electronic circuit, such that as a result said inductive or capacitive portions of power do not interfere with the information supplied to and transmitted by said building power supply network.

This can for instance be realized, by superposing a voltage, precisely adjustable by the operator, or even by adding a particular impedance, which might also comprise ohmic, inductive or capacitive portions, like particularly provided by a suppressor capacitor, whereby a in order to compensate said noise unwanted.

If a household appliance switch comprises an output unit for the switch signals and a receiving unit for switch signals and if both of them are separated from each other by the building power supply network, the advantage is provided, that information provided physically at one end of the switch by input will be propagated by said building power supply network and will be received precisely at that place where they will be processed.

If each of said switch states addresses a different functional level of a building power supply network, such that the advantage is provided that by the help of said switch the functional levels of said household appliance network can be stepped through.

If the household appliance switch comprises a single actuating element, then the advantage is provided that all the functions can be actuated by a single actuating element only, whereby the whole area of home with all its functions will be controlled by one single actuating element only.

If a household appliance switch generates a switch signal, in the first switch status of the first switch element, by a single actuation only, whereby said switch signal is limited in its period then said household appliance switch will not be operated as a common change over switch, supplying the current to the current consumer directly, but a switch signal will be provided.

Such a signal, caused by said switch, being impulse-shaped can be combined with a further switch signal, since no clearing of the line is effected by said signal, in order to generate more complex switch commands in this manner.

Thus it will become possible to operate the lines of a house appliance network in low impedance permanently, by providing said decoupling of the supplying power plant, as defined above, but by impressing a subsidiary voltage, which is precisely controlled and not by opening the circuit of the current consumer.

Thus it will be possible to address a particular control module which in this application will be defined by the term "device supplying power", even by complex switch commands, which always serves as a low impedance voltage supply source for each of the current consumers connected to said household appliance network.

Thus the household appliance switch according to the invention, which is able to switch a building power supply network, which is unaffected of low impedance current consumers, is an inseparable part of the building power supply network.

Thus the building power supply network can be kept free from influences upon the voltage caused by capacities or inductivities, which are caused by the current consumers as listed above without being limited to those examples explicitly mentioned.

Thus it will be also possible to use the household appliance network to propagate information.

More precisely the household appliance switch according to the invention does not provide a direct switch function, but, thanks to the device supplying power, does provide a collaterally switch function by directly supplying the amount of real power, the current consumer precisely needs, by additionally impressing a defined voltage upon said building power supply network with which will keep the noise within the household appliance network low and controllable.

A permanently low impedance feeding into the line a current consumer is connected with provides a variety of advantages the person skilled in the art already knows. One of them its being independent to portions of reactive current which do cause unpredictable conditions of voltage in a high-resistance power supply network, which might disturb the intended communication.

An advantageous possibility to define said impulse is, that the switch impulse lasts a defined first time period.

Hence said switch impulse can be standardized and thus can also be recognized as a standardized switch impulse, i.e. as a first switch impulse for instance.

An advantageous possibility to define a further impulse is, that the period of said switch impulse continues at least one further different period of time, previously defined.

Thus the first switch impulse can be distinguished from at least one further switch impulse such that said switch element can be used for a huge variety of different impulses.

However, if on the other hand one of the switch impulses lasts as long as the user keeps the switch pressed, said switch element could affect a further signal having the shape of a holding signal.

If, a code can be set up by combining said switch impulses, the advantage is provided, that the same combination of switch status can always be recognized by its own codes.

If each identical switch impulse i.e. each code, is allocated to a standardized combination of commands, the advantage is provided, that a standardized code can be allocated by the user which is actuating the actuating element, hereby causing impulses and codes respectively by the change of the switch status, whereby said impulses and codes can be recognized and read out again due to their standardization at any other place.

Such an allocation can be realized for instance by at least one matrix set up in two dimensions, in which standardized switch signals can be placed on function keys. By the help of said matrix switch commands will be transferred into standardized switch commands. Said standardized switch commands can be propagated in said building power supply network, since according to the invention said standardized switch commands will not interfere with any noise existing in said building power supply network and can thus be read out again at precisely the place where said switch commands will be processed, which for instance is the device supplying functional commands.

If said commands for switching or controlling said current consumers, connected to said building power supply network will be placed on function keys in a particular control module, thus at a central place of the building and herewith at one single place of the building, i.e. in the device supplying functional commands, each code is allocated precisely to the combination of commands, necessary to control or to switch said building power supply network.

Thus the advantage is provided, that operations, which can be used everywhere in said building power supply network can be gathered at one single place from where they provide their service in the whole building power supply network.

If switching back and forth between the functional levels of the building power supply network is possible with a particular code, the advantage is provided, that said household appliance switch element switches only said functional levels for instance by inserting a particular code, although said household appliance switch element comprises one single actuating element only.

By the help of said functional levels it will for instance be defined, in which operating level, like for instance first operating level, second operating level, programming level, scenario level etc, the user is stuck in and entering commands. This means that a functional level is characterized by the fact that after entering in said respective functional level, the operator receives access to further or different functional dimensions of said household appliance control system.

If said code for switching back and forth between the functional levels of a building power supply network consists of two switch pulses within the first time period, which practically means a double click, then by entering such a double click, the user can jump from one functional level to another.

It is advantageous if said household appliance enables in the first functional level turning said functional level on and of, that a further functional level enables the selection of appliances, that a still further functional level addresses all the operation statuses of at least one household appliance, and that an other functional level enables programming said functional levels, and that an still other functional level enables to set up particular scenarios.

If a household appliance switch comprises a transmission element, which itself provides the impulses of said household appliance switch and a reception element which receives said impulses previously provided for the various switch status of the household appliance, then the switch status of a household appliance switch and can be locally separated from each other and then the switch status of a household appliance switch and can be locally separated from each other the switch commands can be locally separated from each other as well.

Further a matrix comprising all the switch commands can be provided at a central place from which, from any household appliance switch standardized routines can be requested.

The reception module receiving the switch state of the household appliance switches advantageously is integrated in the device supplying functional commands.

If in each functional level said signal with a first period of time provides the feature to switch a household appliance, each user knows independently from the fact, if he is inaugurated into the further functions to switch said household appliances switch device, or not, that a single impulse always means switching household appliances on or off, or if he is in a functional level, he switches or controls the first household appliance which appears in said modus.

Thus said household appliance switch according to the invention for an inaugurated user appears as a common change over switch independently in which level he is presently operating in, whereby for the instructed user said switch is an instrument which helps him switching through said various functional levels and furthermore the household appliance available in said level and/or at least one of its functions.

If at least one of the codes like for instance the code to change between the functional levels within a building power supply network can be replaced by a further switch element which, according to the invention, will be actuated by a single actuating element only, a household appliance switch results, which can switch more than one switch element by one actuating element only, whereby each switch element comprises at least two switch status.

Hence, for instance, all the household appliance switches which are positioned within an area of home can be operated by a single actuating element only, which also might be positioned at the same place as the ones the user is used to.

If one of the codes like for instance the code to change between the functional levels of the building power supply network is replaced by a further switch element whereby said switch element according to the invention will be operated by the same actuating element, as the first switch element, then a household appliance switch with more than one single switch element results, each switch element having at least two switch status.

If a second switch element already exists, such a further switch element to switch or to control household appliances for instance can be added to the already existing ones.

The same principle can be applied in the case that the code to change between groups of household appliances is replaced by a further switch element.

This principle can also be applied to said functional levels analogously.

If at least one switch element encompasses an output unit the advantage is provided, that it is somehow indicated, if the respective switch element is switched or not.

Thus, in the case that the first switch element is equipped with an output unit, like for instance with a red LED (light emitting diode) it is possible to indicate, that for instance the first switch element is activated and it can also be indicated, that, in the case of a further actuation of the same switch, a different group of household appliances will be addressed, like for instance the blinds.

As the switch element will be actuated via said actuating element, the output of said switch status of said switch element would also be realized via said actuating element collaterally.

If further more an additional switch element comprises an additional output unit, the additional advantage is provided, that it will be indicated additionally, if said respective additional switch element is presently actuated or not.

Thus, in the case that said further switch element is provided with its own output unit, like for instance a blue LED, it is possible to identify, that said second switch element is active for instance, which means that it can be identified, that by a further actuation of the further switch element a further appliance out of the same group of appliances will be addressed, like for instance a lamp.

As the further switch element will also be actuated via said actuating element, the output of the status of said switch element is also realized by said actuating element collaterally.

As simple output unit a light emitting diode is appropriate, which provides the advantage, that it is robust as well as not expensive. A multicolour LED for instance can indicate in which functional level one is operating presently.

If said output unit is a display, the advantage of a huge flexibility is provided, indicating the respective output.

If further more said output unit is separated from the switch element, the advantage is provided, that said output unit is mobile and can last with the user, such that the user can always identify, the status of said respective household appliance in the respective moment of time, thereby the switching procedure itself and herewith also the various switch status, caused by said switch operation, will further be operated with said actuating elements, switching said switch element, which might also be a commonly used planar light switch for instance, looking like any other ordinary light switch.

If alternatively or additionally said output unit is separated from the switch state, which means that it is for instance separated from said impulses, the advantage is provided, that the output unit and said switch elements as well as said actuating element, which is necessary for actuation, remains with the user, such that the user wherever he is, can switch and can identify in which status the respective household appliance is, if the respective device is supposed to indicate that.

In this case the switch status is not bound to the place the output unit is positioned and can be placed wherever the user wants to.

If that the switch status is lodged in a separate and so called transponder box, which itself is placed in the respective room, the advantage is provided, that in the case that a user enters any of said rooms with his mobile switch unit (comprising for instance also a output function), he can switch precisely the various switch status and algorithms respectively which are be placed on function keys in said transponder box which itself is positioned in said respective room, as being appropriate for said particular room.

This means that the user actuates at any place he wants the at least one switch element by the help of his actuating element.

The switch commands are transmitted to said transponder and said transponder recalls the various switch status, allocated to said switch commands, which can be adapted particularly to the room in which said transponder box is placed.

Said transponder box then transmits said individualized commands for said particular room to said device supplying power.

Since said communication between said output unit and switch element is transmitted wireless, the user can move freely in said room. As a communication means, infrared can be used for instance.

Since parts of the output unit can be used as an actuating element at the same time, the user only needs one single element in order to enter or to indicate.

Particularly the part of the output unit can serve as an actuating element, which provides the respective specific output information.

Thus the first respective part of the output unit, which indicates the condition of the first switch element, at the same time can comprise a switch function for the first switch element and the further respective part of the output unit, which indicates the status of the further switch element at the same time can comprise a further switch function for said further switch element. Touch screen displays can be used for instance therefore.

BRIEF DESCRIPTION OF THE DRAWINGS

Further embodiments are shown by the figures.

DETAILED DESCRIPTION OF THE INVENTION

Figure 1:
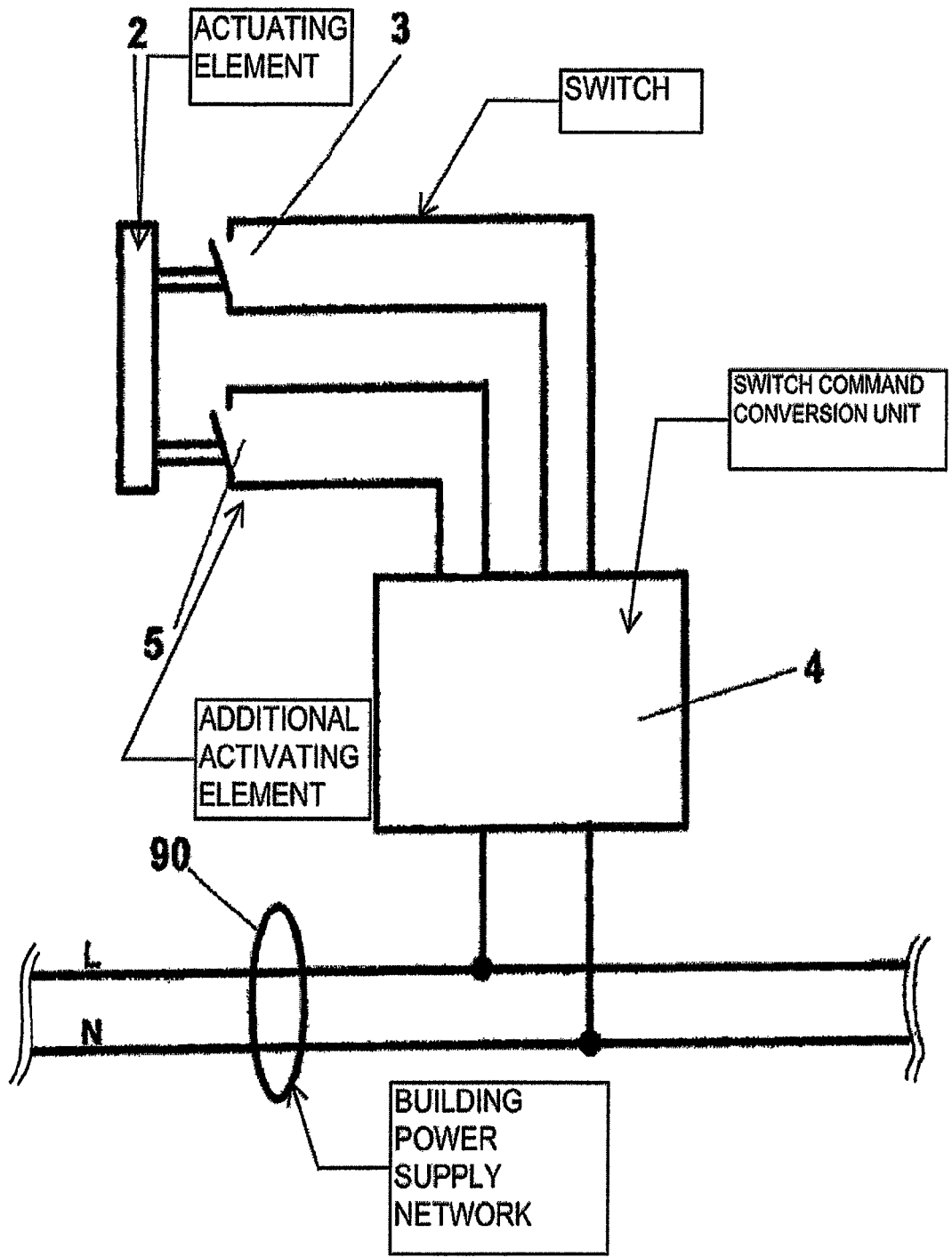
FIG. 1 shows a household appliance switch comprising an actuating element.
Figure 2:
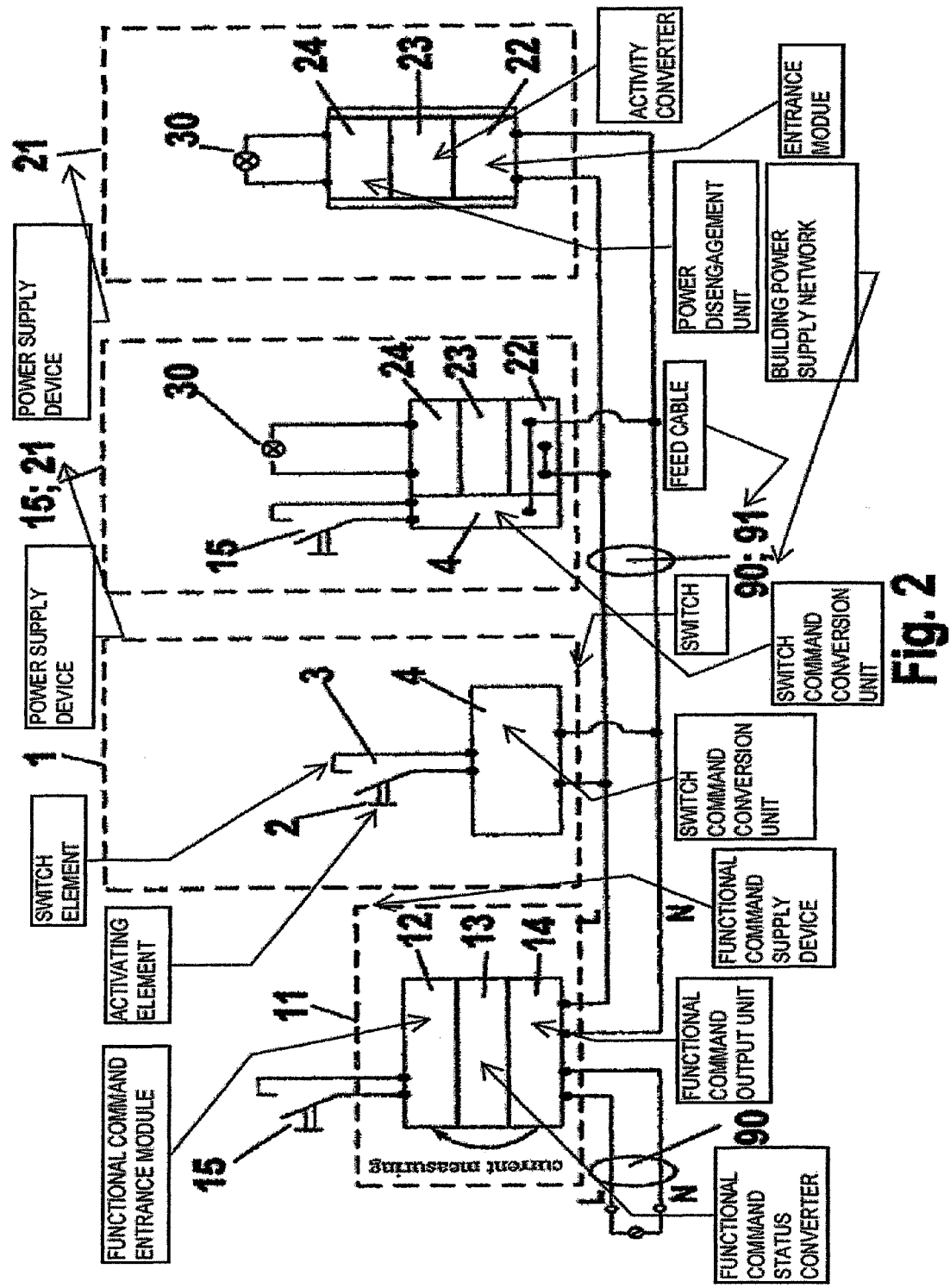
FIG. 2 shows a block diagram of the household appliance control system.

FIG. 2 shows an example of an block diagram, showing the functional units of the household appliance system. The functional unit of the household appliance n switch (1) comprises, as shown in FIG. 1, an actuating element (2), providing the effect that the actuating switch (1) can be actuated by the user. Said type of actuating element (12) comprises at least the switch states "neutral, or "off" respectively and as well as the switch state "impulse" or "on" respectively. Thus an impulse of the duration of the impulse of said switch, effected by the user, is effected.

In order to be operable more easily for a further operation, of said impulse should be somehow standardized, which means that said impulse must have a value or a pattern previously defined. In order to get standardized said impulse is propagated to a switch command conversion unit (4). In said switch command conversion unit (4) standardized switch commands are stored like for instance in an EPROM, whereby said switch commands can also be changed by a person skilled in the art, since a person skilled in the art knows, that EPROMS can be reprogrammed. Alternatively also a variety of further components can be used, providing the feature that a user can store a standardized switch status permanently. By the help of any comparison procedure a person skilled in the art knows, a standardized and suitable switch command, caused by said actuating element (2) of said switch element (3), actuated by a user, is assigned, caused by said actuating element, actuated by a user, by said switch command conversion unit (4).

This can be realized by applying an appropriate microprocessor. In said switch command conversion unit (4) units are provided further more, which do enable it to connect the switch command conversion unit (4) directly to the building power supply network (90), to provide the effect supplying a standardized switch command into building power supply network (90) without damaging said household appliance switch (1) hereby. Alternatively the household appliance switch (1) can be connected to the device supplying power (21) and/or the device supplying functional commands (11). An example of a device supplying power in shown in FIG. 3b.

Depending on the embodiment, such a household appliance switch (1) not only comprises a memory, but also a microprocessor.

If said microprocessors is combined with a further unit, comprising a further microprocessor itself, like for instance the device supplying functional commands (11) or the device supplying power (21) the tasks, allocated to said first microprocessor can also be supported by at least one of said further processors. In this particular case, the switch command conversion unit (4) then is a part of the respective unit, like from the device supplying functional commands (11) or the device supplying power (21).

Tasks, allocated to said microprocessor are operated in further microprocessors, if in combination with a further device, comprising a microcontroller, like for instance the device supplying functional commands (11) or the device supplying power (21).

If at least one of the codes according to the invention, like for instance the code to change between the functional levels of a building power supply network (90) can be replaced by a further switch element (3) (see FIG. 1) which according to the invention will be actuated by just a single actuating element (2), then a household appliance switch results, which provides the capability to switch more than one switch element (3) with one single actuating element only, whereby each switch element (3) comprises at least two switch-states. Hence, all household appliance switches (1) situated in an area of a home can be actuated by a single actuating element only, whereby said actuating element (3) comprises at least two switching states. Thus all household appliances, situated in an area of home can be actuated by a single actuating element only, which can be positioned precisely at the places one is used to actuate said switches of household appliances. FIG. 1 shows such a type of switch whereby an additional actuating element (5) is shown behind the actuating element as an example.

Beside said components already mentioned, providing operability for said household appliance switch (1) and providing a standardized switch command as described before or providing a standardized switch command in any other way the person skilled in the art knows, for said switch command, the evaluating unit of any of said switch commands is provided as a further element of said household appliance switch (1), which will be termed in this application as "functional command entrance module (12)", providing the effect, to recognize the switch commands, which were standardized before they were sent.

This is of a particular importance, since the building power supply network (90) is the only means to transport information between said switch command conversion unit (4) and said functional command entrance unit (12). Thus the additional advantage is provided, that said switch information and said switch information of the household appliance switch (1) respectively, whereby said household appliance switch (1) in this example can regarded as a transmitter of switch information, are propagated everywhere in said building power supply network (90), whereby the functional command entrance module (12), in this particular and illustrated case, serves as a receiving section for the switch command.

Propagating said switch signal via said building power supply network (90) provides particular challenges in order to provide the ability to read said information out again properly and independently from the zero-crossings of the sinus of the power and/or current.

One of the sources of noise, which can effect the transmission of information via said building power supply network (90) is the noise impressed by the power plants themselves as well as the control signals they provide for organization purpose by said power plants, whereby said signals usually are audio range signals. Furthermore the current consumers connected to said building power supply network (90) with their particular inductances and capacities do provide a particular noise for said building power supply network. For this reason, up to now it was not possible to provide a building power supply network (90), to which an arbitrary number of current consumers is connected with. The number of current consumers connectable primarily depends on the transmission protocol. A transmission protocol is particularly preferred, which enables it to address 225 single house hold appliances, 15 generic (i.e. can be allocated freely) appliance groups, 15 groups of appliance classes (light/audio/blind etc, . . . ) and all household appliances at the same time. A person skilled in the art would not understand this example as limiting, but would also consider to address more than 225 single house hold appliances, or 15 generic appliance groups or 15 groups of appliance.

Up to now it was problematic, to use the building power supply network (90) or parts of it for transportation purpose of switch-information or to use parts of it to control information respectively, since the noise resulting from various origins does interfere so intensively, that the information impressed once cannot be read out again so precisely anymore, that they could be furtherprocessed.

Said problems can be set aside during the short period, when the sinus-curve of the ac-voltage is zero crossing, by impressing information in said short period; however, this trick does not solve the underlying problem at all which is the influence noise does provide; this trick at the best avoids said problem for said little period. Using this trick further more consequently means, that only current consumers can be used which themselves do not provide any significant capacitance or inductance. However, such ideal conditions practically do not appear at all in common building power supply networks (90).

This means, that a building power supply network (90), operated under such ideal conditions however does not allow a connection of current consumers providing inductive or capacitive noise upon said building power supply network (90). This means furthermore that in reality, a second building power supply network (90) would be necessary, only having connected such current consumers, providing no inductive or capacitive noise at all toward the building power supply network (90), like bulbs for instance.

This is a problem of all the state of art embodiments and was solved according the invention by impressing information independently to their respective zero-crossing either on the alternating voltage or on the alternating current, whereby said information can be read out again from both of them, and whereby said information exclusively consists of real power, which means, that said information does also distinguish from the sinus of the ac-voltage of the building power supply network so significantly, that said information can be recognized, which further more means that said information can also be read out again.

Said impression of real power in this sense is particularly possible if during said period of impression the building power supply network (90) is either disconnected for a short while from the supplying power plant, or is superposed by a feed-in of power, controlled in an appropriate way, such that said building power supply network (90) disconnected from said power plant in such a way can be controlled such that the noise which already is inside said building power supply network (90) can be compensated by a particular electronic circuit, such that said information can be impressed, which ought to be impressed upon the current consumer feed cable (91) (which is the part of cable of the building power supply network between the device supplying functional commands (11) and the device supplying power (21)) and can be read out again at any place of the building power supply network (90).

Figure 5A:
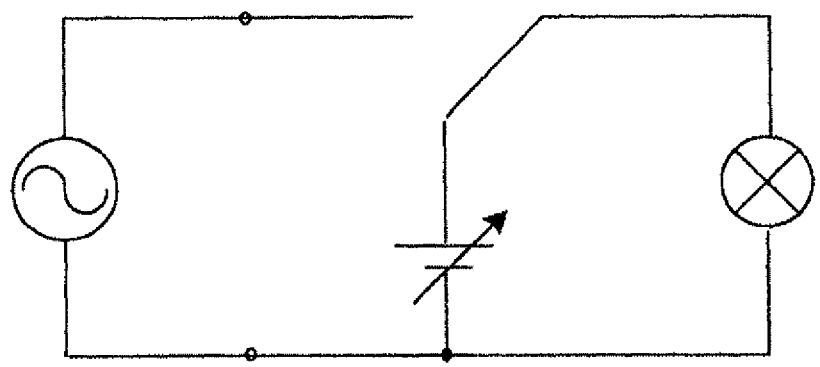
FIG. 5*a-b* shows possible embodiments of circuits for separate the household appliance network for impressing real power pulses.
Figure 5B:
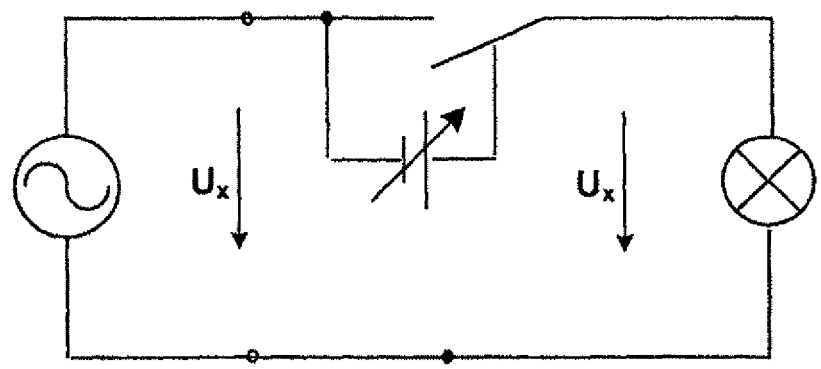
Figure 6A:
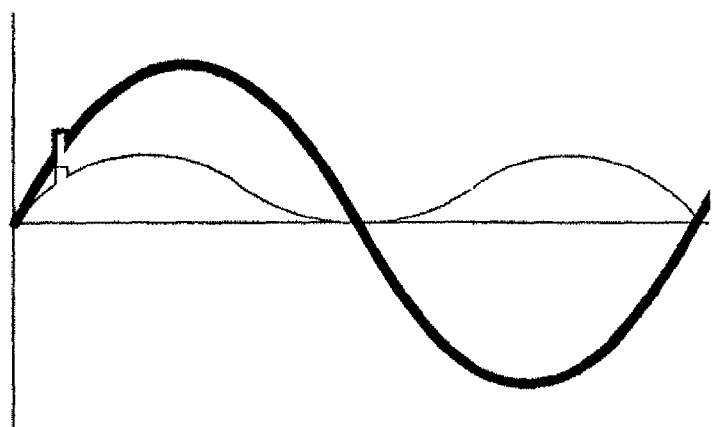
FIG. 6*a-e* shows a shows a power-curve and a current-curve each and the combined real power effected hereby (comprising said impressed pulses).
Figure 6B:
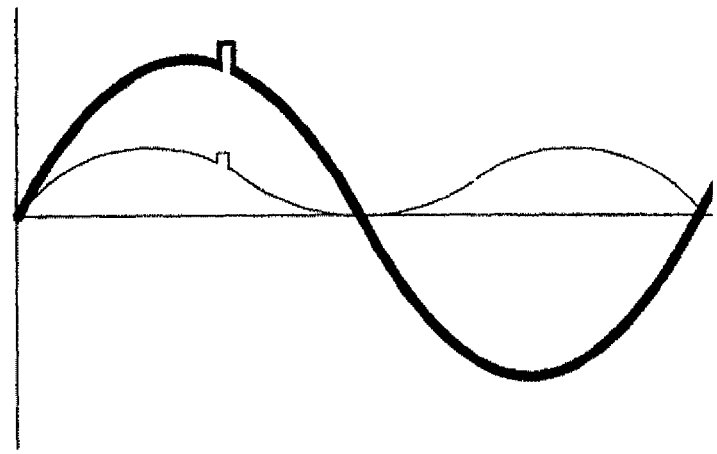
Figure 6C:
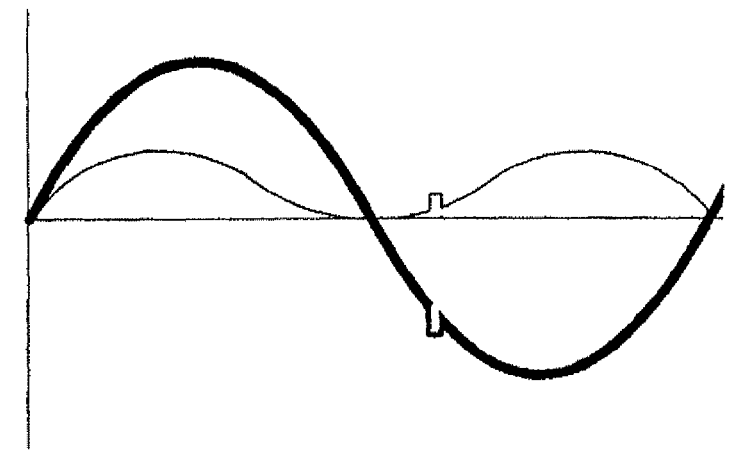
Figure 6D:
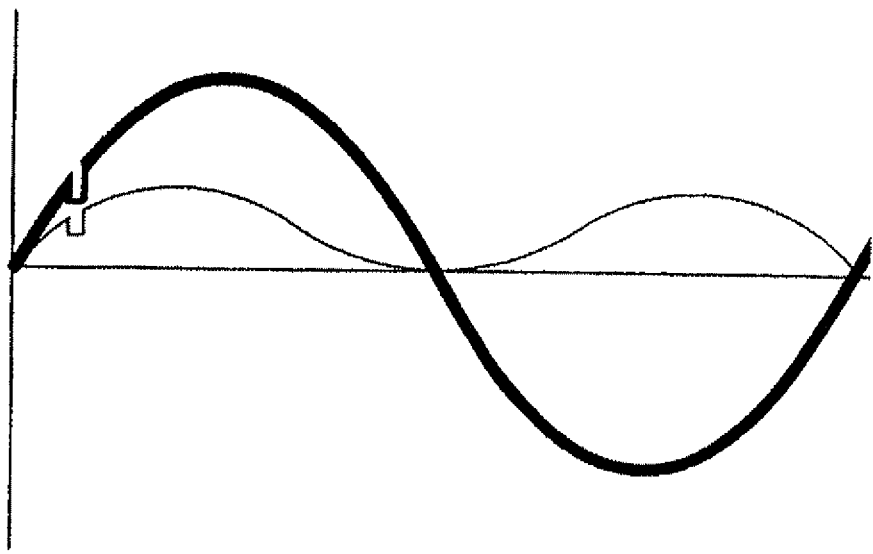
Figure 6E:
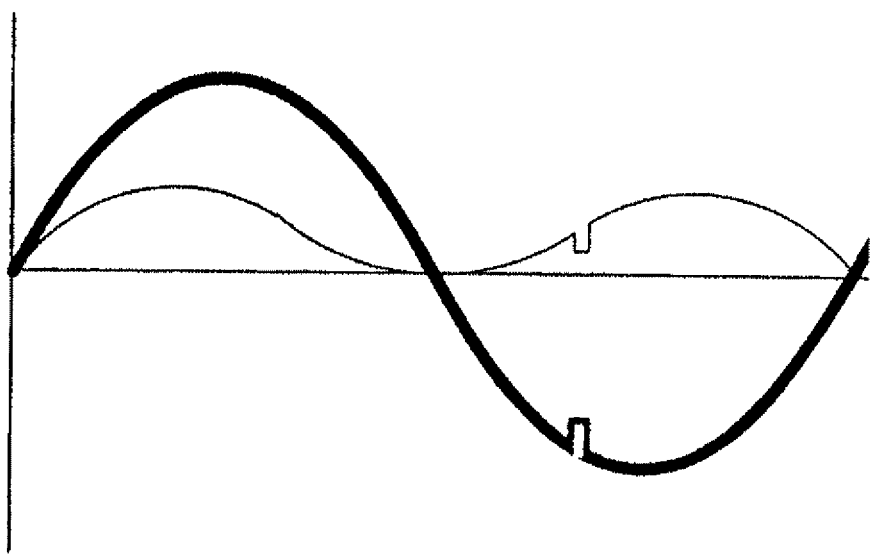

The separation of the current consumer feed cable (91), which itself is also part of the building power supply network (90) will be realized by an electronic circuit, as shown in FIGS. 5a and 5b, but not limited to said figures.

The schematic drawings of FIGS. 5a and 5b each show a voltage supply source, symbolized as a power plant or even more precisely for instance a house service connection, a controllable voltage supply source, which can impress a controllable voltage supply source, whereby its voltage can be impressed upon said current consumer circuit as well as upon said current consumer itself, whereby said controllable voltage supply source can be positioned in series connection or in parallel connection to the current consumer circuit.

The respective references of $U_x$ and $U_y$ both indicate that the voltage on both sides does not have to be identical necessarily.

By this reason according to the invention, it is not necessary at all anymore, to impress information near the zero crossing of the voltage or the current. Rather according to the invention any place of the sinus-oscillation of the current and/or voltage respectively can now be used to impress information. Hence the phase difference as well as the amplitude or both can now also be used as a carrier of information, whereby the amplitude of impression of information can occur by addition or subtraction upon the original curve progression.

The building power supply network (90) being controlled by following this principle can serve as a means to propagate information for various kinds of information, like information to control or to operate a current consumer, which do origin from a different source than the household appliance switch (1).

Further more also the device supplying functional commands (11) is capable to read out information out of said consumer feed cable (91), by detecting the current consumption of current consumers as well as by allocating the particular temporal patterns of the current consumption of current consumers to the switch on or switch off procedure of said current consumer or to the status of being switched on or being switched off, whereby particularly the characteristic combination of real power and reactive power as well as the efficiency factor each show particular features which can be recognized or as an alternative, that particular features can also be created in a particular unit, suitable for a creation of such a type of information, like for instance a short pulse of effective power or of real power comprising a characteristic, i.e. a recognizable, which also means a allocable, pattern.

This means that information from any place of the feed cable (91) can be propagated towards the "modulator". Such information do not have to result out of the nature of the appliance creating it necessarily, but can also be created artificially by signal converters or out of other information.

This means that also household appliance switches have to be considered, as being comprised by said household appliance switches according to the invention, which are not actuated by an user actuating an actuating element (2) directly, but also household appliance switches of the type of actuating element (2) comprising a sensor, whereby said sensor works like an actuating element (2), which means that an impulse is effected, whereby said impulse can be standardized in a further step, but does not have to be standardized necessarily, if a standardized signal is already effected.

It does not effect the principle of the underlying invention, if parts of a distance is bridgedover by radio, or by other wireless means of transmission of information alternatively.

As an example, it might be desired for accounting purposes, that parts of a building power supply network (90) are operated separated from each other in two or more floors of a single house, but at the same time having the switch commands of a household appliance switch (1) provided everywhere in said house, because if for instance in the event of an emergency certain switch commands are provided by a fire detector for instance and the respective fire safety devices must be addressed in the whole building and not in a single floor only, like for instance to switch on the fire sprinkling system in the whole building and on one single floor only. The person skilled in the art would also transfer said principle to operate alarm devices, settings for reducing energy consumption etc.

Hereby the functional command entrance module (12) is the receiving section of the switch, providing the function to scan the plausibility and correctness of said information, propagated by said building power supply network (90) and to ensure that the communication via said building power supply network (90) works without any errors. Further more said functional command entrance module (12) ensures that even after reception of said switch commands they are readable and furtherprocessable for further units or parts of units.

This means that said functional command entrance module (12) is an integral part of said household appliance switch (1), wherever said functional command entrance module (12) is positioned in the building power supply network (90).

In the case that a threshold for errors, previously entered by a programmer would be exceeded during a propagation of switch commands via said building power supply network (90), said household appliance control system (100) can be switched in a state of an emergency operation, or switches into an emergency operation itself. In said emergency operation basic functions are provided, like for instance supplying the components relevant for security purpose in said building power supply network (90), of the lights for instance. Which components are comprised hereby can be programmed individually by the programmer regarding the respective building or building part or even the purpose of said building for instance.

A further possibility to control said building power supply network (90) specifically, is to identify groups of household appliances, like for instance washing machines, or vacuum cleaners, or immersion heaters, even provided by different manufacturers, by identifying the typical pattern of noise each, of them or the respective group provides, typically does emit into said building power supply network (90).

This can for instance be realized by storing typical patterns of noise, which is/are characteristic for a particular home appliance in a central memory. After a comparison between the actual value of the noise provided in the building power supply network (90) and the target which is said data stored in said memory, the respective group or particular household appliance which is connected to said building power supply network (90) can be identified precisely.

This can be provided to the user as information and can also consider specific counter actions, recalled out of a further memory, in order to extinguish the respective noise independent to this provision.

By this way it can be ensured that said building power supply network (90) can even be calmed, in the case that current consumers are connected to said building power supply network (90) as well as that current consumers disconnected from said building power supply network (90).

By this way also an automatic recognition can be realized, for instance by processing for instance an iteration identifying a group of current consumers first and in at least a further step then identifying an appliance of a particular manufacturer. To enable such an identification, a microprocessor having the appropriate power and a memory with an appropriate capacity is needed as well as a profile of the household appliance (30), which has to be identified has to be stored first.

Figure 4A:
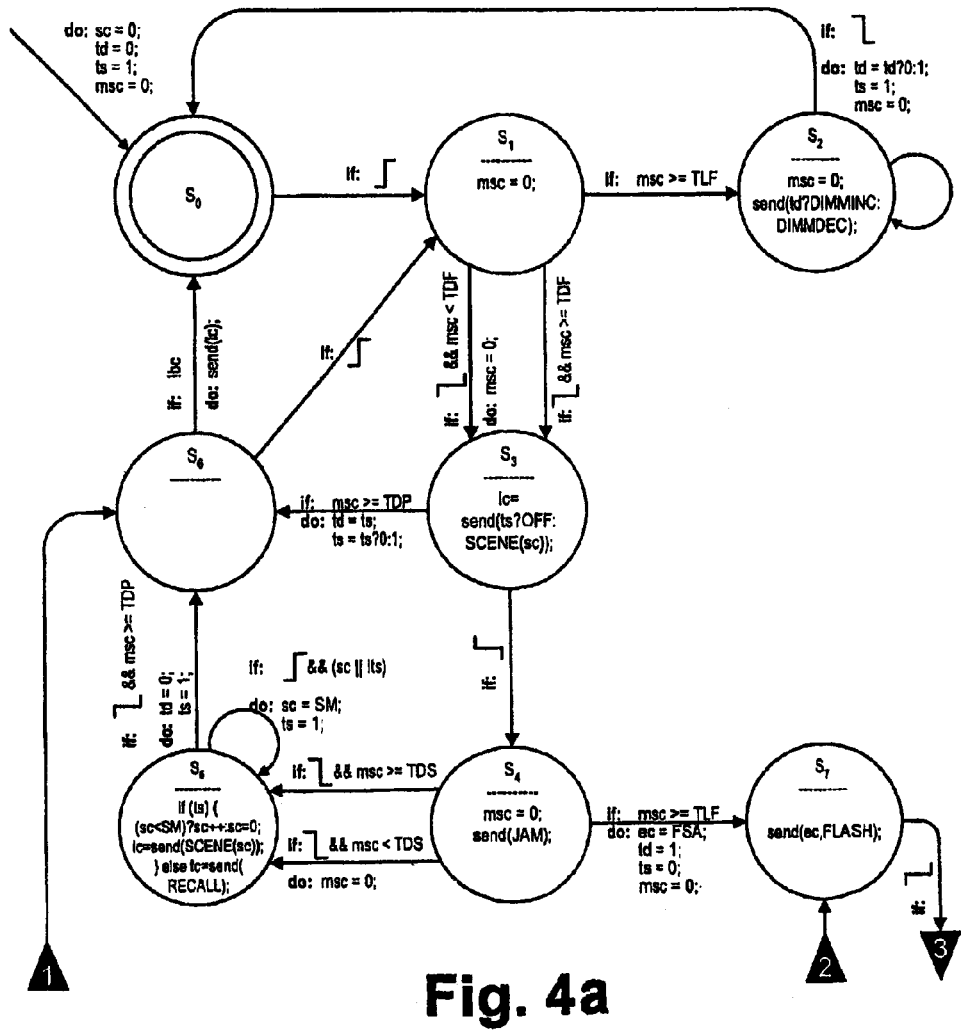
FIG. 4 shows a state diagram for the function of a household appliance switch.
Figure 4B:
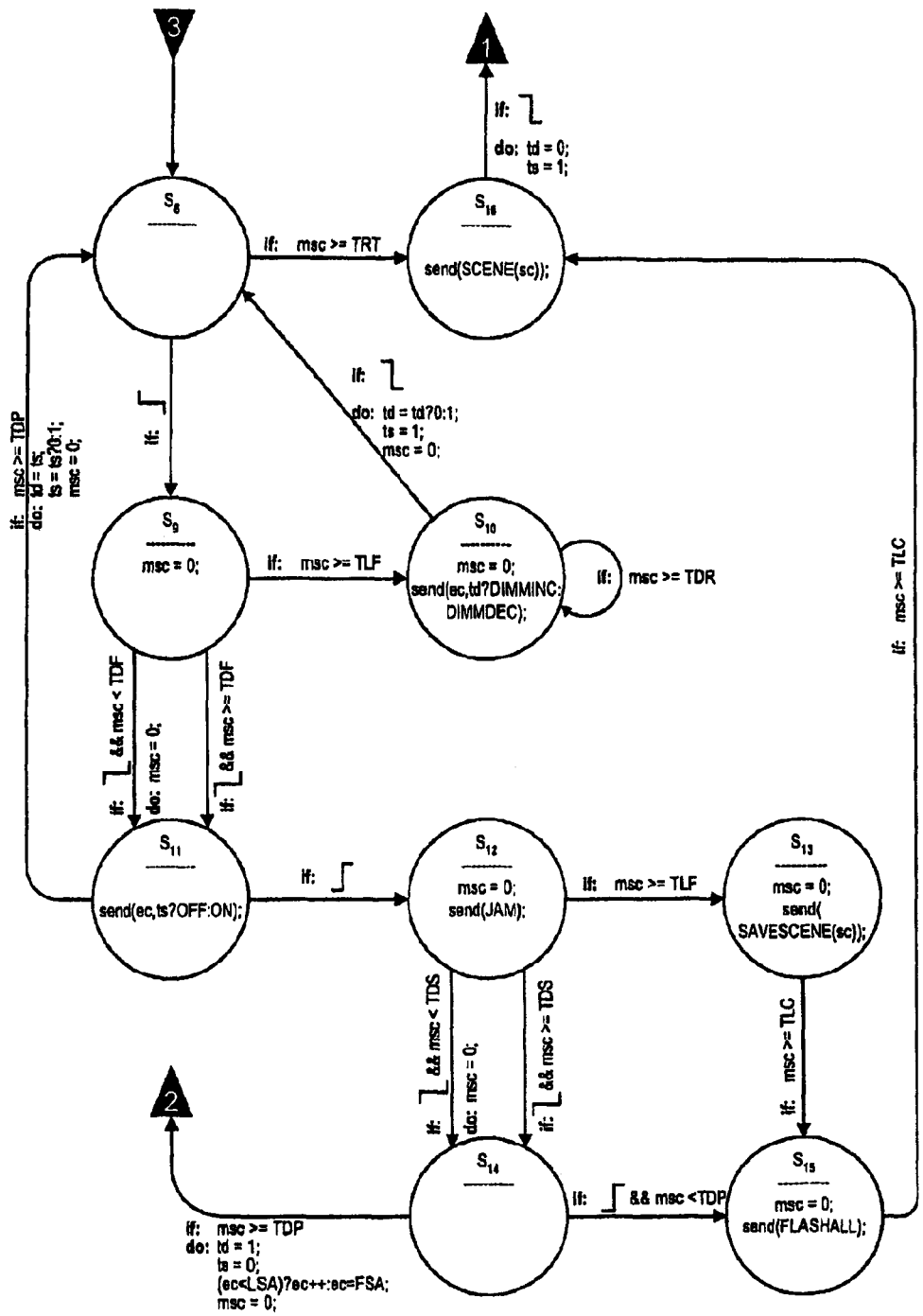

FIG. 4 shows a state diagram, like the ones a person skilled in the art is used to take as a basis for programming said household appliance switch (1). In principle said switch, said device providing functional commands (11), and said device providing power (21) are programmable freely.

Particularly the character of the underlying standardized switch commands of said household appliance switch (1) is programmable. Said standardized switch commands are then emitted to said building power supply network (90). Further more also the character of the reaction of the current consumer after the reception of said commands by said device supplying functional commands (11) is also programmable. In all said three non limiting examples it is desirable that the person skilled in the art customizes said programmable functions according to the common behaviour, or by following the wishes of the user following the expectations of the user.

Since each of said switch elements (3) comprises an switch-obstacle, starting from the second switch state, the effect is provided, that the access to the further functional levels the building power supply network (90) provides is hampered for persons which are not inaugurated in the existence and in the functions of said obstacles.

Hence for instance each actuation of the upper and the lower switch elements (3) might be provided with the obstacle provided for instance by a counterforce, which hinders an actuation starting with the second switch state. In this whole application here, the term "obstacle" also comprises each combination of input pulses a user is not used to actuate, in order to switch a known feature. For instance a user of a household appliance pushbutton-switch is not used to actuate said button by a double pulse, if he would like to switch on the light for instance. For this reason said double pulse to switch a light on falls under the above definition of an obstacle according to the invention. Alternative and non limiting, further obstacles are physical counterforces, colours, warning signals, sounds etc.

Hence for instance all current consumers of a previously defined area of home can be set into any state, previously defined, only by using a single actuating element (2). This can be realized such that in the memory of said household appliance switch (1) it was deposited that said memory recognizes not only a single pulse, but also a second pulse as a further pulse, which is different to said first pulse, like a double-pulse for instance. A further pulse which is different to said first and said second pulse can also be deposited. Even further deposition of pulses, like of a long-term pulse is possible also.

Hence for instance two different, deposited and standardized pulses can avail for the same purposes. One of said purposes can be the feature to work off the rows of the matrix for instance, in which the commands are deposited. Thus the user does not need to have the sequence of pulses in his mind, to effect a particular switch command; on the other hand it is adequate, that the user knows the switch commands which have a functional purpose, like for instance to pass through the x-axis or the y-axis of the matrix in which the switch commands are deposited.

For instance a short-long-pulse can get assigned the task to jump directly into the third position of the y-direction of said matrix and a short-long-long pulse for instance to the fourth position of said matrix etc. A double pulse for instance can also get assigned the feature to proceed towards the "x-direction", on the "y-axis" previously selected, such that each element of a matrix can be reached indeed, which consequently means that the user only has to keep a very few sequences of pulses in his mind.

The characteristics of said pulses can be defined by the user himself as well as the features provided by them, and both then are programmable respectively by a person skilled in the art. According to common usage, a single pulse can thus get the feature assigned to select the respective command in said matrix element and to activate it.

Hence, a plurality of for instance even standardized switch orders can be activated by one single household appliance switch (1) only, comprising just one actuating element (2). In the case, the user would like to have a less abstract operation procedure, therefore, an outer shape of a household appliance switch (1) might have to be considered, comprising more than just one switch element (3) under his only one single actuating element (2). Such a type of switch is shown in FIG. 1. Underlying the case of a rectangular actuating element (2), a switch element (3) at the right outer edge, or at the left outer edge, or at the upper or at the lower edge, or any combination of switch elements (3) attached like that can be considered. Said switch elements (3) can be programmed such that it does provide the possibility to proceed in a matrix one step upwards, downwards, to the left or to the right, effecting to select a command, deposited in one of them by a single pulse only.

An alternative allocation could also be realized such that a particular combination allows a direct jump to the respective y-axis in which commands for actuating a jalousie are stored for instance. Further more and starting from that point, an actuation of the upper switch element (3) could effect a closure of said jalousie and an actuation of the lower switch element (3) could effect an opening of said jalousie and an actuation of the centre of said actuation element (2) could effect a stopping of said jalousie.

A further allocation could also be of the alternative kind that a switch element, which is allocated at the upper or lower part of said actuating element (2) could be addressed, whereby a step upward or downward in the matrix is effected. Such a kind of household appliance switch (1) can for instance be programmed in such a way, that one can reach the second level by a double pulse, the third level by a triple pulse, the fourth level by a quadruple pulse, the fifth level by a quintuple pulse and so on. After having selected the level of interest a pulse on the right part of the switch element (3) can effect a progression to the right and a pulse on the left part of the switch element (3) can effect a progression to the left. If for instance said particular level is the level to address all the light emitting household appliances, a progression to switch one light emitting device after an other is effected. If on the other hand instead of the lamps in this particular level (or in a different level one is operating) the radio is addressable, said switch can be programmed in such a way that for instance switching on the right part of said switch the next radio station can be selected and switching to the left part of said switch the previous radio station can be selected and switching the upper part of said switch can pump up the volume and switching the lower part of said switch can reduce the volume. In the level in which the shutters are addressed or in which any other current consumer is addressed, or in which a group of current consumers is addressed, allocation of the switch can be realized in an analogous way.

A further functional level can be provided as a programming level, for programming purpose only.

In said level each individual current consumer is controllable as well as each of its functional levels is controllable by said actuating element (2) of said household appliance switch (1) and a suitable allocation hereby selected can be stored for further operation.

An example of an allocation can be of the kind that the respective current consumers are stepped through step by step, such that the respective current consumer of interest appearing can then be selected. After being selected, let us take as an example only the radio, the radio station of interest can be selected as previously described by actuating the left or right edge of the switch element (3) and by actuating the upper or lower edge, the volume can be increased or reduced.

Having defined that an actuation of the upper/lower edge controls the volume and that an actuation of the right or left edge selects the radio station, said definition can then be confirmed in the programming level to get stored, by storing it in a memory.

After having stored said definition, in a further step, a further current consumer can be selected, by stepping through said current users, as described previously already, like the lamps, the shutters etc., whereby their respective functions can be set and stored analogously.

As soon as all of said current consumers of a first area of living are set as intended, said whole scenario can be confirmed by a particular confirmation-code, which means that from then on said whole scenario can be switched on directly as a whole.

Said type of definable scenarios is suitable particularly to react upon situations of danger, like for instance fire or house braking or even for various services like child care etc.

A further functional element of said household appliance control system (100) is said device supplying functional commands (11). The functional command entrance module (12) has the duty to receive switch commands and to process them respectively and to provide functional commands in said current consumer feed cable (91) for all the current consumers.

If it is desired to create independent circuits by reasons of system organization, or if said current consumer cables which are connected to said device supplying functional commands (11), would excess the maximum demand of for (instance) 16 ampere in household appliances, it is also possible to use more than one device supplying functional commands (11).

Therefore said device supplying functional commands (11) comprises at least one functional command entrance module (12), connected to said building power supply network (90), to be supplied with said switch commands of said household appliance switch (1) according to the invention, whereby said device supplying functional commands (11), which means that said device supplying functional commands (11) also identifies switch commands of at least one household appliance switch (1).

Said functional command entrance module (12) itself does not provide any switching activities for the current consumer. Said functional command entrance module (12) analyzes said data provided in said building power supply network (90) if they are erroneous.

Therefore a nominal/actual value comparison is performed between the actual information which is provided via said building power supply network (90) on the one hand side with the nominal information stored in said memory on the other hand side.

The person skilled in the art can further more type in a threshold defining the point from which on said household appliance system can be operated in a state of emergency operation, in the case that the nominal/actual values do not match in a satisfying way.

Alternatively or also additionally there might also be provided a correction unit, which is connected to said functional command entrance module (12) for support purpose, which in a way the person killed in the art knows, tries to correct a signal which does not have a quality sufficient to be further operated, into a signal which is then identifiable for the further steps of processing.

Alternatively a household appliance switch (1) could also be connected to said functional command entrance module (12) directly or said functional command entrance module (12) receives its commands from such a switch connected directly to it as well as from the building power supply network (90), to which also said household appliance switch (1) is connected to, as shown in FIG. 2.

Further more also an emergency switch can be applied directly to said device supplying functional commands (11), in order to enable a switching or a controlling respectively of at least one household appliance even in its emergency operation.

At least a part of said principle to use said building power supply network (90) for information transportation purpose can be utilized hereby.

Further more said switch comprises a functional command status converter (13), which allocates at least one functional command to the respective switching commands of the at least one household appliance switches (1).

By the help of said functional command status converter (13) the respectively allocated functional commands are assigned to said switch state.

This can for instance be realized by such a type of memory, in which the functional commands possible were previously deposited into by programming.

An operation can be realized by any appropriate micro controller, known to the person skilled in the art. In this case the switch command serves to activate the functional command whereby said functional command itself is released by the functional command output unit (14).

A functional command output unit (14) is emitting said allocated functional command to said power supply network (90), such that at precisely the appropriate moment, the building power supply network (90) is disconnected for a short moment from the power plant while information are applied to said building power supply network by impressing information independently to their respective zero-crossing either on the alternating voltage or on the alternating current, whereby said information can be read out again from both of them, and whereby said information exclusively consists of real power.

Therefore said functional command entrance module (12) can be installed at any place in said building power supply network (90).

Said device supplying functional commands (11) needs an input unit, which creates the control signals for said appliances, which have to be controlled according to the requirements of the user (or be an automatic process). This can be a pushbutton as a simple embodiment, which is connected to said device supplying functional commands (11) in order to realize controlling the lights (switching them on/of, dimming of one or more lamps or group of lamps).

A more efficient alternative functional command status converter (13) comprises a small controlling unit comprising sensors for the luminosity, the temperature, the humidity and multifunctional buttons a whole room can be controlled with. This means that it would be a functional command status converter (13) for the whole room. Those functional command status converter (13) usually are flush mounted in rooms, such that they can be integrated without problems in an installation already existing.

The usual voltage in European building power supply networks (90) is 230 volts and in US-American building power supply networks (90) 110 volts. The functional command entrance module (12) is capable to operate in alternating current networks, which typically operate below 690 volts, which means that they particularly operate in one of the common voltages like 110/115/120 volts in US American homes or 220/230/240 volts in for instance European homes for household appliances.

Typical configurations of such a device supplying functional commands (11) are a DIN-Rail or other typical sizes for flush mounting. Device supplying functional commands (11) of that type are usually suitable for an amount of 16 ampere, such that a whole circuit can be controlled with a single device supplying functional commands (11).

Each switch command provided by the building power supply network (90) will therefore be sent via said building power supply network (90) as a discrete package of data, comprising a defined number of digital data, which were stored as a standardized switch status or which were impressed by said functional command output unit as a functional command upon said voltage and/or current in said building power supply network (90).

Since all the functional commands provided by said device supplying functional commands (11) can be received at any device supplying power (21), every switch command comprises additional information, for which device supplying power (21) said functional command is dedicated.

Depending on the intended use switch commands can receive a different shape. Short type switch commands, which do transmit only simple commands, like "on" or "off" are so called "implicit switch commands". Their advantage is that they can be propagated very quickly.

Contrary hereto longer commands can propagate a pattern which itself can be taken as a data for operation or can for instance effect even complex functions, like storing or recalling of data of operation previously stored, or like storing or recalling an internal parameter, supplying the device providing power (21) with functional commands.

A further functional element of the household appliance control system (100) is the device providing power (21). FIG. 2 shows, that said device providing power (21) is positioned between said device supplying functional commands (11) and at least one household appliance (30) in said building power supply network (90).

Hence it is the link between said device supplying functional commands (11) in which all the current consumers are bundled and in which the functions, which can be centralized are to be summarized.

Thus further potential for further miniaturization of said device supplying functional commands (11) is provided, such that the device said device supplying power (21) can be connected to or even in every current consumer one can think of directly which means that it is thus also allocated to it directly.

Figure 3A:
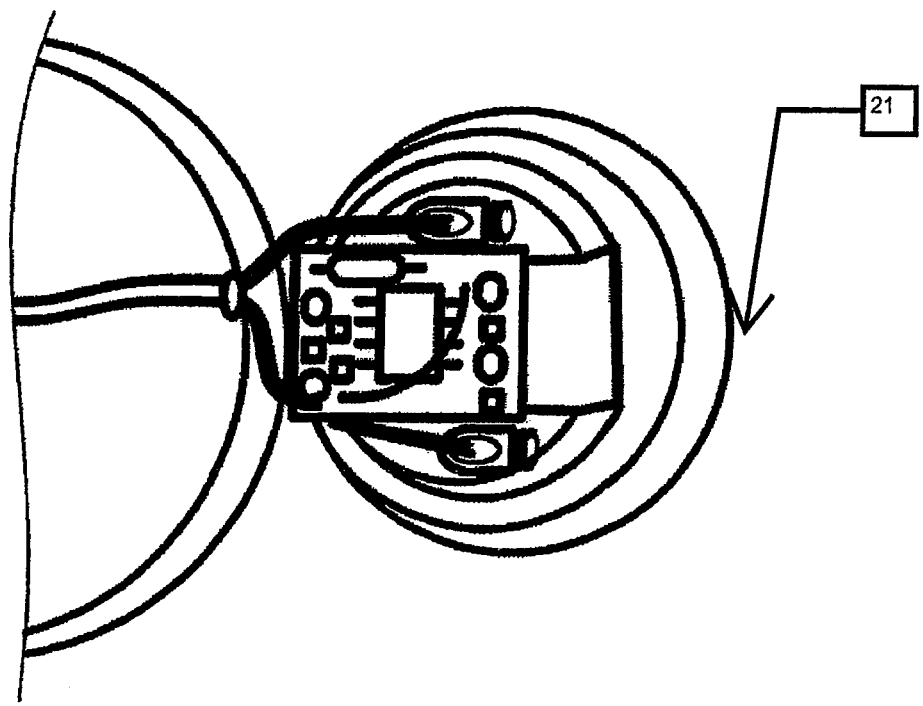
FIG. 3*a* shows a device supplying power integrated into a lamp socket.
Figure 3B:
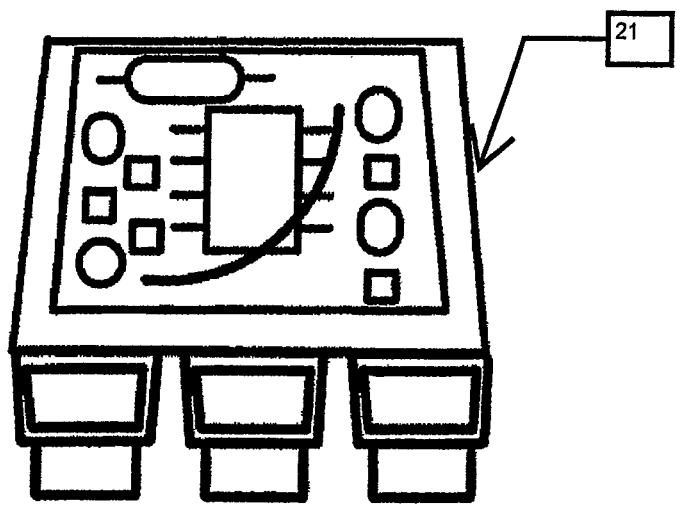
FIG. 3*b* shows a device supplying power, integrated into a insulating screw joint.

Therefore it is also mountable into a luster terminal, as FIG. 3a shows. Hence current consumers like for instance lamps, jalousies, bulls, pumps, heating devices, fluorescent lamps etc. are operable.

Said device supplying power (21) can also be installed in intermediate modules like for instance in dimmer-modules, relays-modules etc.

Said device supplying functional commands (11) can further more also be into the current consumers themselves ex factory.

Thus a energy saving lamp can also have said device supplying power (21) at the inner part of his socket, which means, that seen from outside it is not recognizable, that it is an energy saving lamp, which is operable in a household appliance control system according to the invention.

Said device supplying power (21) serves to control data of operation of a household appliance (30) remotely. This means that said device supplying power (21) is the component which individualizes the functional commands provided in the whole building power supply network (90) for the respective individual current consumer or the respective household appliance.

Said device supplying functional commands (11) is further more a component which has to process the hugest amount of information, since said device supplying functional commands (11) identifies if a switch command is addressed to it and in the event that it is addressed to it, said device supplying functional commands (11) sets the condition which is appropriate to the respective switch state.

To operate this, said device supplying functional commands (11) has access to a memory known by a person skilled in the art as well as to a microprocessor known by a person skilled in the art.

Said device supplying power (21) comprises an entrance module (22), receiving the functional command from the device supplying functional commands (11).

The activity converter (23), shown in FIG. 2 allocates the respective power to work for the respective current consumer, according to the respective functional command. It comprises furthermore a power disengaging unit (24), providing the respective amount of output suitable, such that said current consumer can work properly.

Alternatively a local control of the device supplying power (21) is also possible, by having an emergency switch applied at the respective current consumer, whereby said emergency switch (not shown in FIG. 2) is at least that far capable to communicate with the device supplying power (21), such that as a emergency function the functions to switch said device on and off does last.

This is possible since said activity converter (23) comprises a particular command, which effects that in this particular case the power which is necessary to operate is provided from the device supplying functional commands (11).

Hereby the functional command is transmitted via said building power supply network according to the invention, whereby said functional command is not understood by the other devices supplying power (21) in such a way that they might be addressed directly.

Each device supplying power (21) comprises an unambiguous for instance numerical address to be addressed properly. In said example 225 different devices supplying power (21) can be addressed by one single device supplying functional commands (11) only. Further more it is possible to address an optional number of devices supplying power (21) by one single device supplying functional commands (11) only. Further more it is also possible to directly address for instance fifteen discrete groups directly, each comprising an optional number of devices supplying power (21).

This means, that an optional number of devices supplying power (21) can be addressed at the same time by one single functional command only.

Each device supplying power (21) in principle can be allocated to one group only or even to more of said for instance 15 groups. A functional command can either be sent to a single address only or even to a group dress. One single group, for instance group 15 has an exceptional position, since each device supplying power (21) is always member of said particular group. This means that the membership of said group can never be abolished.

Consequently, a command to group 15 always reaches each single device supplying power (21), which is operated at said device supplying functional commands (11).

A central parameter of a device supplying power (21) is the data of operation. Said parameter always represents the operating status of the current consumer (on/off of the switch; 0 ... 100% of the dimmer; 0 ... 100% of opening the jalousie etc.). All functional commands do have the purpose to manipulate said data of operation as effectively as possible. This is why behind each of said addresses precisely one data of operation is hidden.

Beside the address the functional command always comprises one particular command, which should initiate a particular function of said device supplying power (21). This might be for instance: switching on; switching off, increasing luminescence etc. Such standard commands directly effects the data of operation. Further more there are also additional commands, to store a particular value, in order be capable to recall said value later, or to calibrate particular parameters of the device supplying power (21), like for instance configuring the standard luminosity of a lamp, the membership to a group, or similar aspects. Such special commands particularly serve to configure or to integrate a system.

For transmission purpose a protocol is set up particularly in between the device supplying functional commands (11) and the device supplying power (21) by help of the building power supply network (90), which makes the transmission easier or does even enable said transmission.

To guarantee the transmission reliability in said household appliance network (90), a check sum is added to the functional command and an extensive filtering as well as an extensive benchmark test checking the quality of transmission is provided, in order to avoid erroneous functional commands.

Further more the reception of said functional commands is only possible, if a so called starter-signal, known by the person skilled in the art as a starter-flag was recognized.

Such a starter signal could for instance be of the type of a sequence of four "1"-bits and a "0". The other part of said command, called the command-part, then does not comprise such a sequence of four "1"-bits at all, such that said sequence is unambiguously recognizable as a start-flag. This can for instance be realized by adding to the content of a functional command after three "1"-bits always an additional "0"-bit.

Said additional "0"-bit is known as a "separating"-bit to the person skilled in the art and is added, if upon said three "1"-bits, a "0", would have followed anyway.

Otherwise, the receiving section would not know, if said "0, is a "separating"-bit or a "data"-bit, if it would be followed by a "1".

FIG. 4 shows a state-diagram, also known by those skilled in the art. Said state-diagram describes the functions of for instance an switch-switch according to the invention, comprising exemplary functions like dimming, change of scenario, programming of a scene by one button only, which means with one single actuating element only.

For said state-diagram the following symbol is used:
Elementary circles do represent states in said state-diagram;
in said circle the name of the state is mentioned (for instance SO), as well as commands, which have to be executed the first time when said state is occurs the first time;
arrows so represent transitions. It is mentioned on said arrows which requirements are necessary for the execution of said transition (if:) and, if that is the case, which orders have to be executed for the transition (do:).
Since the one-way-button is a central element of the state-diagram, its conditions are represented by the following symbols:
⌋ pressed button,
⌉ letting it go;
The legend further more comprises the terms
msc: milliseconds-counter;
TDP: maximum pulse duration of a double-click (usually about 160 ms);
TDS maximum pulse duration of the second click of a double-click; (usually about 250 ms);
TLC maximum duration of telegram (usually 400 ms);
FSA first appliance address (usually: 65);
LSA last appliance address (usually 70).

To understand FIG. 4, it is important to keep in mind that in order to understand said state-diagram: said variable msc will be augmented about the value "1" from a unit outside said state-diagram only.

The feature "send" (cmd) or send (adr, cmd) respectively is not blocking and is used to send commands (cmd) either to all current consumers or to a current consumer particularly selected before. Hereby said state-diagram uses the following commands:
DIMMINC: dim up the current consumer for a single step only;
DIMMDEC: dim down the current consumer for a single step only;
OFF: to switch the current consumer off;
ON, to switch the current consumer on;
SCENE (sc) means recall a scene at the current consumer;
RECALL: to repeat the last value (before OFF) at the current consumer;
FLASH: to let the current consumer blink;
FLASHALL: To let all the current consumers blink
SAVESCENE (sc): Save the scene in the current consumer
JAM: Quit the current transmission
The feature send( ) sends back the command sensed, such that it can be stored for a later utilization. Variables are indicated by lower case characters and consonants are indicated by upper case letters.

Based on said state-diagram the person skilled in the art can program the switch functions described:

The invention claimed is:
1. A household appliance control system, comprising:
at least one household appliance switch (1) connected to a building power supply network (90), the at least one household appliance switch (1) comprising at least a single actuating element (2), at least a single switch element (3) with at least two switch states per switch element, whereby each switch element (3) has its own switch obstacle starting from the second switch state, wherein the at least one household appliance switch (1) is adapted for impressing information to a fraction of a cycle of either the alternating voltage or the alternating current independent to their respective zero-crossing, wherein said information exclusively consists of readable real power;

at least one device supplying functional commands (11) connected to the building power supply network (90) which communicates the functional commands, wherein said device supplying functional commands (11) comprises at least one functional command entrance module (12), wherein the at least one device supplying functional commands (11) is adapted for impressing information to a fraction of a cycle of either the alternating voltage or the alternating current independent to their respective zero-crossing, whereby said information exclusively consists of readable real power, wherein switching commands of at least one household appliance (30) can be identified, wherein the device supplying functional commands (11) further includes a functional command status converter (13) for allocating at least one functional command to respective switching commands of the at least one household appliance switch (1), and a functional command output unit (14) for outputting allocated functional command to the building power supply network (90);

at least one device supplying power (21) connected to the building power supply network (90) between the device supplying functional commands (11) and the at least one household appliance (30), whereby the building power supply network (90) serves for their communication by impressing information to a fraction of a cycle of either the alternating voltage or the alternating current independent to their respective zero-crossing, whereby said information exclusively consists of readable real power, wherein said device supplying power (21) comprises a functional command entrance module (22) configured to receive at least one of the functional commands, an activity converter (23) for allocating a respective power quantity to the functional command and a power disengaging unit (24) for providing the respective amount of power; wherein the household appliance switch (1), the device supplying the functional commands (11), and the device supplying power (21) are at least partially arranged in the building power supply network, and wherein they at least partially communicate among each other via said building power supply network (90) by impressing information independently to their respective zero-crossing to a fraction of a cycle of either the alternating voltage or the alternating current, wherein said information exclusively consists of real power readable from both the voltage and the current.

2. The household appliance control system according to claim 1, wherein said building power supply network comprises at least two functional levels, whereby functional commands can be transmitted in each of said functional levels.

3. The household appliance control system according to claim 2, wherein communicating said functional commands via said building power supply network is unaffected by low-impedance appliances.

4. The household appliance control system according to claim 3, wherein said building power supply network is forwarding commands from at least the device supplying functional commands to at least one device supplying power.

5. The household appliance control system according to claim 4, wherein communicating said functional commands between at least one of said house appliance switch, said device supplying functional commands and said device supplying power is effected exclusively via said existing building power supply network.

6. A device supplying functional commands comprising:
at least one functional command entrance module (12), a functional command status converter (13) for allocating at least one functional command to respective switching commands of at least one household appliance (30), and a functional command output unit (14) for outputting allocated functional command to a building power supply network (90), wherein the device supplying functional commands (11) is configured for arranging in the building power supply network (90) which communicates the at least one functional command by impressing information to a fraction of a cycle of either the alternating voltage or the alternating current independent to their respective zero-crossing, whereby said information exclusively consists of readable real power and wherein switching commands of at least one household appliance (30) can be identified.

7. The device supplying functional commands according to claim 6, wherein functional commands are transmitted in each of a plurality of functional levels of a building power supply network.

8. The device supplying functional commands according to claim 7, wherein communicating said functional commands via an existing building power supply network is unaffected by low-impedance current consumers.

9. The device supplying functional commands according to claim 8, wherein said functional command output unit is a low-impedance power supply source.

10. The device supplying functional commands according to claim 9, wherein impressing real power pulses upon the oscillation of the alternating voltage is effected by adding said information to its amplitude.

11. The device supplying functional commands according to claim 10, wherein the phasing, of the oscillation of the voltage supplied to the appliance feed or its amplitude serves as an information carrier.

12. The device supplying functional commands according to claim 11, wherein the phase difference or the signal to be impressed are used as information carriers for the functional level and the functional command.

13. The device supplying functional commands according to claim 12, wherein the number of oscillations characterizing an functional command is lower or equal to the number of the oscillations characterizing a functional level.

14. The device supplying functional commands according to claim 13, wherein a functional command addresses at least one household appliance separately, or groups of household appliances, or functions of at least one household appliance or effects the chronological sequence of functions of at least one household appliance.

15. The device supplying functional commands according to claim 14, wherein the functional command defines the cooperation of at least one function of a household appliance with at least one function of one or more further household appliances.

16. The device supplying functional commands according to claim 15, wherein a functional level in an appliance feeding line is defined by impressing a certain feature upon a defined number of oscillations either of the alternating voltage or the alternating current.

17. The device supplying functional commands according to claim 16, wherein the certain feature consists of a combination of real power pulses which are outputted from the functional command output unit to the appliance feeding line.

18. The device supplying functional commands according to claim 17, wherein the respective proper combination of real power pulses is provided by the functional command status converter.

19. The device supplying functional commands according to claim 18, wherein the functional command status converter precisely provides the same number of combination of pulses corresponding to the switching states received by the functional command entrance module.

20. The device supplying functional commands according to claim 19, wherein the functional command is propagated within an certain numbers of sinus-oscillations of the network by a transmitting protocol.

21. The device supplying functional commands according to claim 20, wherein the functional command is defined by a characteristic feature of a defined number of oscillations in the power line of the building power supply network, which is different to the characteristic feature of a defined number of oscillations defining the functional level.

22. The device supplying functional commands according to claim 21, wherein the device supplying functional commands is connected to a fuse.

23. The device supplying functional commands according to claim 22, wherein an emergency switch is connected to the device supplying functional commands.

24. A device supplying power (21) comprising a functional command entrance module (22) configured to receive at least one functional command, an activity converter (23) for allocating a respective power quantity to the at least one functional command, and a power disengaging unit (24) for providing the respective amount of power, wherein the device supplying power (21) is configured for arranging in a building power supply network (90) between a device supplying functional commands (11) and at least one household appliance (30), the device supplying functional commands (11) being in communication with the device supplying power the building power supply network (90) by impressing information to a fraction of a cycle of either the alternating voltage or the alternating current independent to their respective zero-crossing, whereby said information exclusively consists of readable real power.

25. The device supplying power according to claim 24, wherein functional commands are transmitted in each of a plurality of functional levels of a building power supply network.

26. The device supplying power according to claim 25, wherein communicating said functional commands via the existing building power supply network is unaffected by low-impedance current consumers.

27. The device supplying power according to claim 26, wherein the power disengaging unit is a low-impedance voltage source.

28. The device supplying power according to claim 27, wherein the functional level and at least one functional command are allocated to the device supplying power via said building power supply network, controlling a household appliance according to it.

29. The device supplying power according to claim 28, wherein the device supplying power is impressing an information to a sinus-oscillation of the supply voltage.

30. The device supplying power according to claim 29, wherein an override switch is connected to the device supplying power.

31. The device supplying power according to claim 30, wherein the device supplying power is affixed to each appliance.

32. A household appliance switch (1) comprising at least a single actuating element (2), at least a single switch element (3) connectable to a building power supply network (90) and having at least two switch states per switch element, whereby each switch element (3) has its own switch obstacle starting from the second switch state, wherein the household appliance switch (1) is adapted for impressing information to a fraction of a cycle of either the alternating voltage or the alternating current independent to their respective zero-crossing, whereby said information exclusively consists of readable real power.

33. The household appliance switch according to claim 32, wherein the household appliance switch is unaffected by interferences, caused by low-impedance current consumers.

34. The household appliance switch according to claim 33, wherein the household appliance switch comprises an output unit for the switch signals and a receiving unit for switch signals and that both of them are separated from each other by the building power supply network.

35. The household appliance switch according to claim 34, wherein each of said switch states addresses a different functional level of a building power supply network.

36. The household appliance switch according to claim 35, wherein the first functional level enables turning on and off, that a further functional level enables the selection of appliances, that a still further functional level addresses all the operation statuses of at least one household appliance, and that another functional level enables programming said functional levels, and that a still another functional level is enabled to set up particular scenarios.

37. The household appliance switch according to claim 36, wherein the household appliance switch comprises a transmission module and reception module.

38. The household appliance switch according to claim 37, wherein the device supplying functional commands comprises a reception module receiving the switch state of the household appliance switches.

39. The household appliance switch according to claim 38, wherein in each functional level said signal with a first period of time provides the feature to switch a household appliance.

40. The household appliance switch according to claim 39, wherein the household appliance switch comprises a single actuating element.

41. The household appliance switch according to claim 40, wherein the household appliance switch generates a switch signal, in the first switch status of the first switch element, by a single actuation only, whereby said switch signal is limited in its period.

42. The household appliance switch according to claim 41, wherein the switch impulse lasts a defined first time period.

43. The household appliance switch according to claim 42, wherein said switch impulse continues at least one further different period of time that is previously defined.

44. The household appliance switch according to claim 43, wherein one of the switch impulses lasts as long as the user keeps the switch pressed.

45. The household appliance switch according to claim 44, wherein a code is be set up by combining said switch impulses.

46. The household appliance switch according to claim 45, wherein an identical switch impulse is allocated to a standardized combination of commands.

47. The household appliance switch according to claim 46, wherein, in the device supplying functional commands, each code is allocated precisely to the combination of commands necessary to control or to switch said building power supply network.

48. The household appliance switch according to claim 47, wherein switching back and forth between the functional levels of the building power supply network is possible with a particular code.

49. The household appliance switch according to claim 48, wherein the code for switching back and forth between the functional levels of a building power supply network consists of two switch pulses within the first time period.

50. The household appliance switch according to claim 49, wherein at least one of the codes can be replaced by a further switch element.

51. The household appliance switch (1) according to claim 50, wherein the code to change between the functional levels of the building power supply network is replaced by a further switch element.

52. The household appliance switch according to claim 51, wherein the code to change between groups of household appliances is replaced by a further switch element.

53. The household appliance switch according to claim 52, wherein at least one switch element encompasses an output unit.

54. The household appliance switch according to claim 53, wherein the output unit is a light emitting diode.

55. The household appliance switch according to claim 54, wherein the output unit is a display.

56. The household appliance switch according to claim 55, wherein the output unit is separated from the switch element.

57. The household appliance switch according to claim 56, wherein the output unit is separated from the switch state.

58. The household appliance switch according to claim 57, wherein the switch status is lodged in a separate transponder box.

59. The household appliance switch according to claim 58, wherein the communication between said output unit and said switch element is radio controlled.

60. The household appliance switch according to claim 59, wherein parts of the output unit can be used as an actuating element.

* * * * *